(12) United States Patent
Wang et al.

(10) Patent No.: US 11,970,235 B2
(45) Date of Patent: Apr. 30, 2024

(54) ADAPTIVE VEHICLE HEADLIGHT

(71) Applicant: CHIAN YIH OPTOTECH CO., LTD., Miaoli County (TW)

(72) Inventors: Cheng Wang, Taipei (TW); Ming-Feng Kuo, New Taipei (TW); Wen-Hong Zhang, Miaoli County (TW)

(73) Assignee: CHIAN YIH OPTOTECH CO., LTD., Miaoli County (TW)

( * ) Notice: Subject to any disclaimer, the term of this patent is extended or adjusted under 35 U.S.C. 154(b) by 77 days.

(21) Appl. No.: 17/697,055

(22) Filed: Mar. 17, 2022

(65) Prior Publication Data

US 2022/0297780 A1 Sep. 22, 2022

(30) Foreign Application Priority Data

Mar. 19, 2021 (TW) .................................. 110109927

(51) Int. Cl.
*B62J 6/023* (2020.01)
*F21S 41/60* (2018.01)

(52) U.S. Cl.
CPC .............. *B62J 6/023* (2020.02); *F21S 41/60* (2018.01)

(58) Field of Classification Search
CPC ................................... F21S 41/60; B62J 6/023
See application file for complete search history.

(56) References Cited

U.S. PATENT DOCUMENTS

| | | |
|---|---|---|
| 4,833,573 A | 5/1989 | Miyauchi et al. |
| 4,922,390 A | 5/1990 | Nakazawa et al. |
| 5,426,571 A * | 6/1995 | Jones ..................... B60Q 1/115 |
| | | 362/466 |
| 6,550,944 B2 | 4/2003 | Kusagaya |
| 10,267,472 B2 | 4/2019 | Suwa et al. |
| 2015/0338045 A1 | 11/2015 | Lin et al. |
| 2016/0339834 A1 | 11/2016 | Oshima et al. |

FOREIGN PATENT DOCUMENTS

| | | |
|---|---|---|
| CN | 1218138 C | 9/2005 |
| CN | 102954421 A | 3/2013 |
| CN | 102328616 B | 6/2014 |
| DE | 3917263 A1 | 12/1989 |
| EP | 1288069 A2 | 3/2003 |
| IT | MI20131056 A1 | 12/2014 |
| JP | 63162388 A | 7/1988 |
| JP | 741808 U | 7/1995 |
| JP | 2542837 | * 10/1996 |
| JP | 201370943 A | 4/2013 |
| JP | 201582409 A | 4/2015 |
| TW | 201242814 A1 | 11/2012 |

* cited by examiner

*Primary Examiner* — Thomas M Sember
(74) *Attorney, Agent, or Firm* — Li & Cai Intellectual Property (USA) Office

(57) ABSTRACT

An adaptive vehicle headlight is provided for being installed on a vehicle body for use. The adaptive vehicle headlight includes a light body, an optical lens, a driver, and a control unit. The optical lens, the driver, and the control unit are integrated into the light body. In practice, the optical lens can optionally include a light distributing member. The control unit can cause an operation of the driver according to a tilt angle of the vehicle body, such that the optical lens and/or the light distributing member are rotated to a predetermined angle, so as to produce an illumination pattern in a horizontal state.

14 Claims, 35 Drawing Sheets

ADAPTIVE VEHICLE HEADLIGHT

CROSS-REFERENCE TO RELATED PATENT APPLICATION

This application claims the benefit of priority to Taiwan Patent Application No. 110109927, filed on Mar. 19, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a vehicle headlight, and more particularly to an adaptive vehicle headlight, which can provide auxiliary illumination for curved roads and is suitable for two-wheeled vehicles such as motorcycles and bicycles.

BACKGROUND OF THE DISCLOSURE

The headlight (headlamp), referred to by some as the "eyes" of a vehicle such as a motorcycle or a car, is very important to traffic safety. In the early days, an illumination pattern provided by each of low and high beams in the headlight has a fixed orientation and cannot be adjusted to adapt to a tilt angle of a vehicle body. This may cause many inadequacies in actual use. For example, when the vehicle is running on a curved road, the illumination pattern in front of the vehicle would be tilted to the right or left. As a result, there is a blind area of vision present in front of the vehicle, so that the driver is unable to clearly see road conditions at an inside of the curved road and this may cause a traffic accident.

With the continuous advancement of lighting technology for vehicles, more and more headlights with an adjustable lighting pattern appear on the market. Such headlights can adjust characteristics of the lighting pattern according to a tilt angle of a vehicle body, such as a lighting range and a lighting distance, so as to provide the driver with the best vision and ensure driving safety. Among them, a headlight that uses a plurality of fill lights to provide auxiliary lighting for corners. However, the arrangement of the fill lights may lead to the inability in the headlight to reduce volume.

SUMMARY OF THE DISCLOSURE

In response to the above-referenced technical inadequacies, the present disclosure provides an adaptive vehicle headlight that is more reliable and durable.

In one aspect, the present disclosure provides an adaptive vehicle headlight for being installed on a vehicle body for use. The adaptive vehicle headlight includes a light body, an optical lens, a driver, and a control unit. The light body includes a base, a rotating member and a light emitting unit. The base has a carrying portion. The rotating member is configured to rotate relative to the base. The light emitting unit is arranged on the carrying portion to emit an illumination light beam. The optical lens is arranged in the light body to allow the illumination light beam to project outwardly so as to produce an illumination pattern in a horizontal state. The optical lens is connected as a whole to the rotating member. The driver is arranged in the light body to drive the rotating member. The control unit is arranged in the light body to cause an operation of the driver according to a tilt angle of the vehicle body, such that the rotating member and the optical lens synchronously rotate a predetermined angle to maintain the illumination pattern in the horizontal state.

In one aspect, the present disclosure provides an adaptive vehicle headlight for being installed on a vehicle body for use. The adaptive vehicle headlight includes a light body, an optical lens, a driver, and a control unit. The light body includes a base, a light emitting unit, a light guiding member, a rotating member, and a light distributing member. The light emitting unit and the light guiding member are arranged on the base, and the light emitting unit is configured to emit an illumination light beam toward the light guiding member. The rotating member is configured to rotate relative to the base. The light distributing member is connected as a whole to the rotating member. The optical lens is arranged in the light body, and the light distributing member is arranged between the optical lens and the light emitting unit. The driver is arranged in the light body to drive the rotating member. The control unit is arranged in the light body to cause an operation of the driver according to a low beam mode and a high beam mode, such that the light distributing member is driven by the rotating member to move to a first position or a second position.

In conclusion, the adaptive vehicle headlight provided by the present disclosure has the following beneficial effects:

1. The optical lens, the driver, and the control unit are integrated into the light body to be isolated from an external environment, and are not easily affected by external environmental factors such as water and dust, so as to extend lifespan;
2. When a vehicle is running on a curved road, the control unit can cause an operation of the driver according to a tilt angle of a vehicle body, such that the optical lens and/or the light distributing member can be driven by the rotating member to rotate a predetermined angle. Therefore, an auxiliary illumination zone can be produced to reduce or even eliminate blind area of vision in front of the vehicle, thereby improving driving safety;
3. In a structure provided by the present disclosure, only parts (e.g., the optical lens and/or light distributing member) driven by the rotating member rotates and a light source does not rotate, such that heat can be smoothly transmitted from the light source to a housing to be spread out;
4. In the structure provided by the present disclosure, wires pass through fixed parts and cannot be interfered with a rotating mechanism, such that the light body can have better availability;
5. The structure provided by the present disclosure can have a smaller volume due to an arrangement of a motor inside the light body. The motor only drives the rotating member and other relevant parts driven by the rotating member. Therefore, a motor output is smaller, the motor is smaller in size, and the thermal effect of the motor is also reduced.
6. The structure provided by the present disclosure has a follow-up lighting effect of a low beam and also has a high beam, and the low beam can meet regulation requirements during a follow-up process and does not cause glare to an oncoming vehicle.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
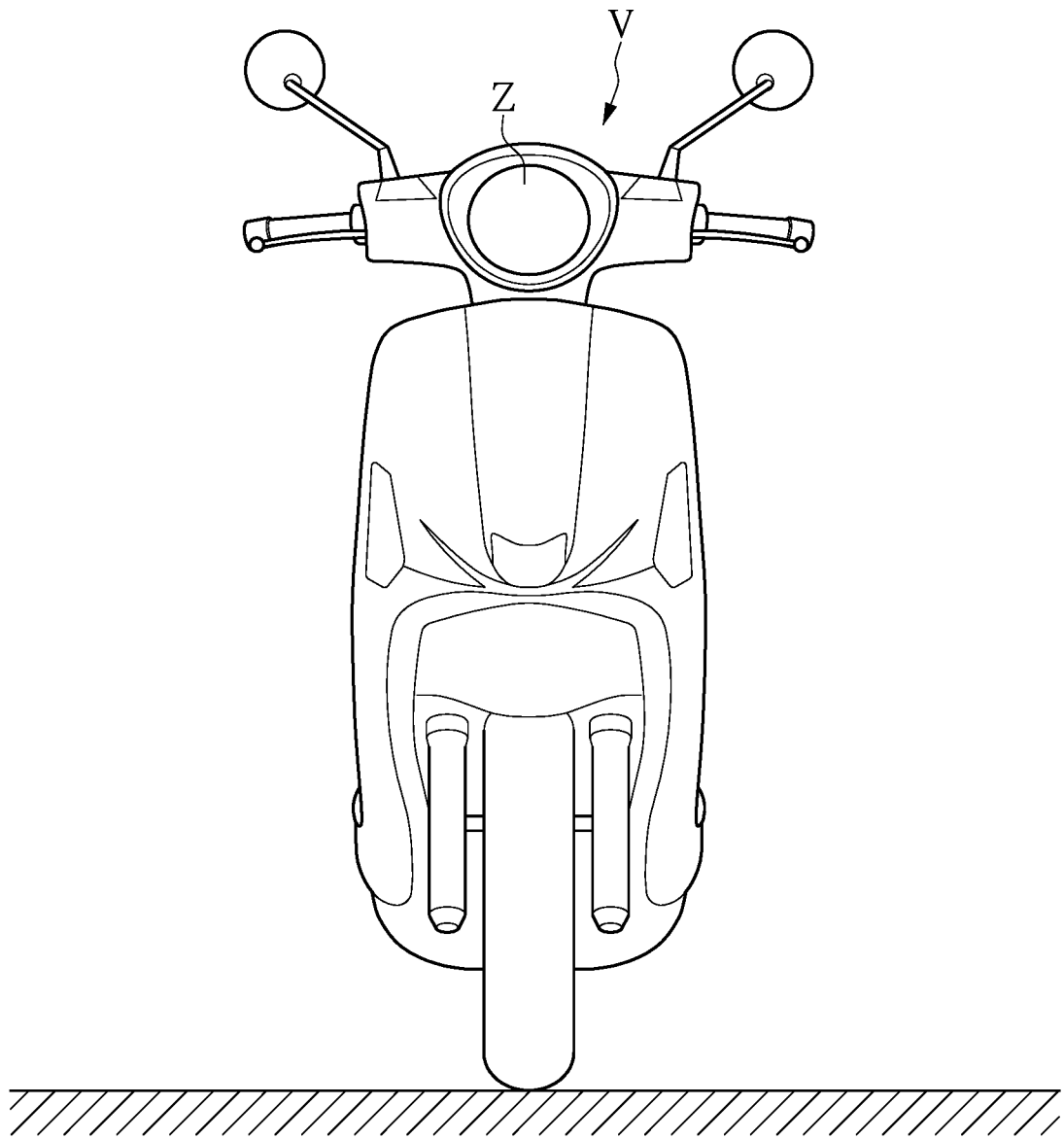
FIG. 1 to FIG. 3 are schematic views showing a motorcycle installed with an adaptive vehicle headlight according to embodiments of the present disclosure.
Figure 2:
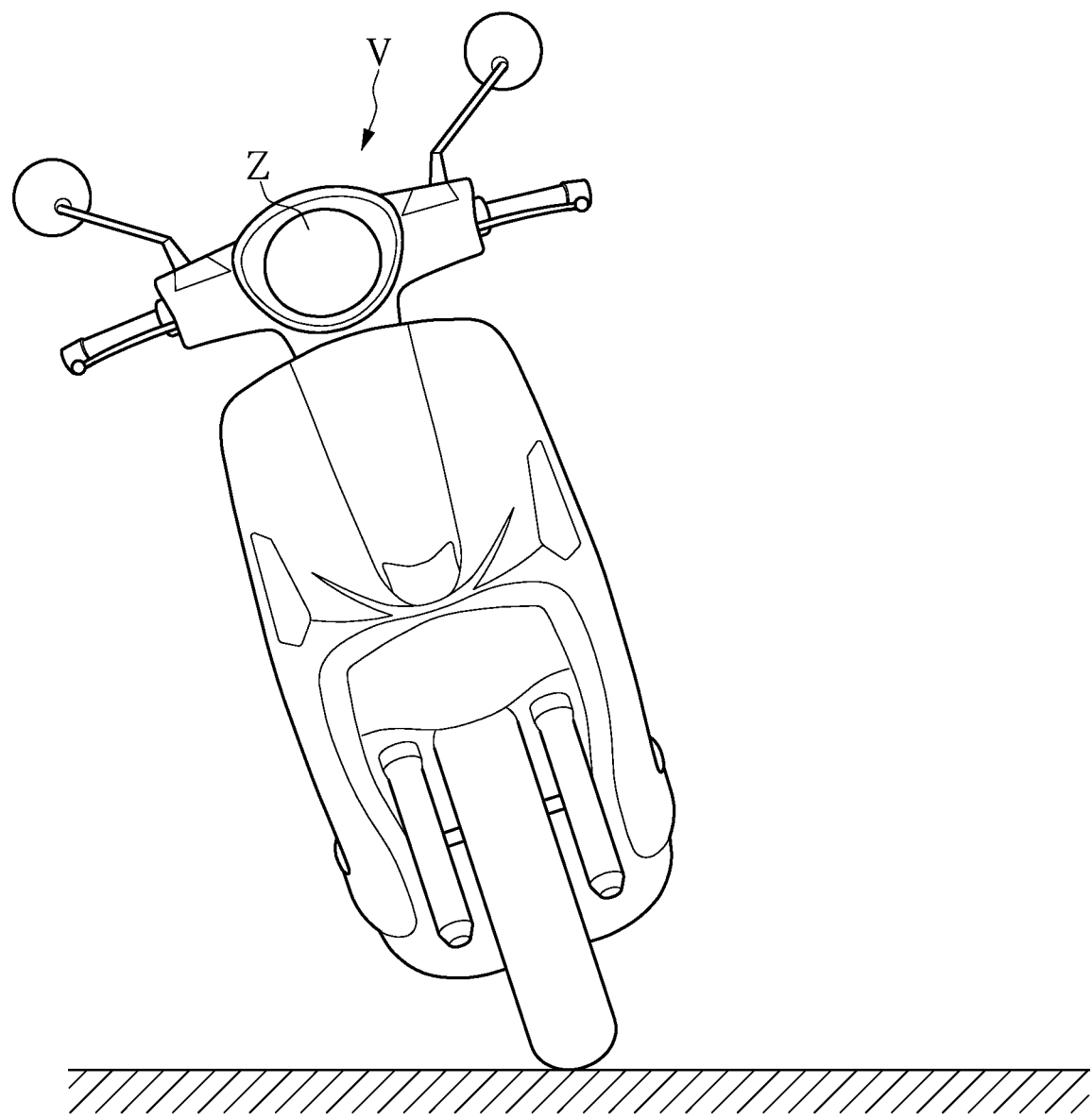
Figure 3:
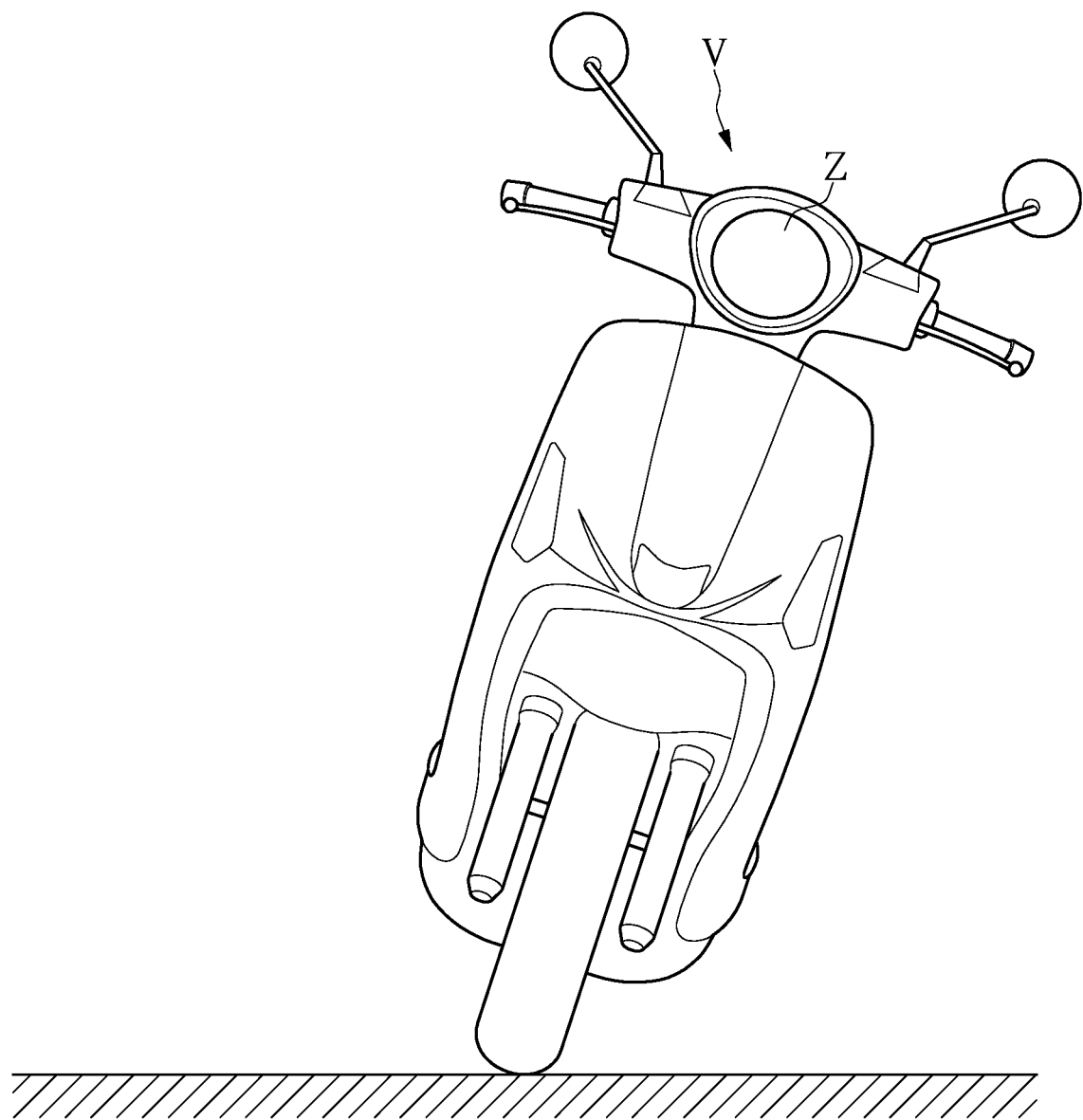

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

All illumination patterns as described herein can meet the light distribution requirements of the ECE R113 regulation which regulates headlamps for producing a symmetrical light pattern.

First Embodiment

Referring to FIG. 1 to FIG. 6B, a first embodiment of the present disclosure provides an adaptive vehicle headlight Z including a light body 1, an optical lens 2, a driver 3, and a control unit 4. The optical lens 2, the driver 3, and the control unit 4 are integrated into the light body 1, specific details of which will be described below. Accordingly, the optical lens 2, the driver 3, and the control unit 4 can be isolated from an external environment, and are not easily affected by external environmental factors such as water and dust. The adaptive vehicle headlight Z of the present disclosure is suitable for two-wheeled vehicles such as fuel motorcycles, electric motorcycles, general bicycles, and electric assisted bicycles. The adaptive vehicle headlight Z of the present disclosure can be installed on a vehicle body V to provide sufficient front illumination during a turn of a vehicle, so as to reduce or even eliminate blind area of vision in front of the vehicle, thereby improving driving safety.

More specifically, the light body 1 includes a base 11, a rotating member 12, and a light emitting unit 13. The base 11 has a carrying portion 11a. The rotating member 12 is configured to rotate relative to the base 11. The light emitting unit 13 is arranged on the carrying portion 11a to emit an illumination light beam. The optical lens 2 is connected as a whole to the rotating member 12 for light distribution of the illumination light beam. That is, the illumination light beam is projected outwardly through the optical lens 2 to produce an illumination pattern having a cut-off line. The driver 3 is configured to drive the rotating member 12. The control unit 4 is configured to cause an operation of the driver 3 according to a tilt angle of the vehicle body V, such that the rotating member 12 synchronously rotates a predetermined angle with the optical lens 2.

Figure 6A:
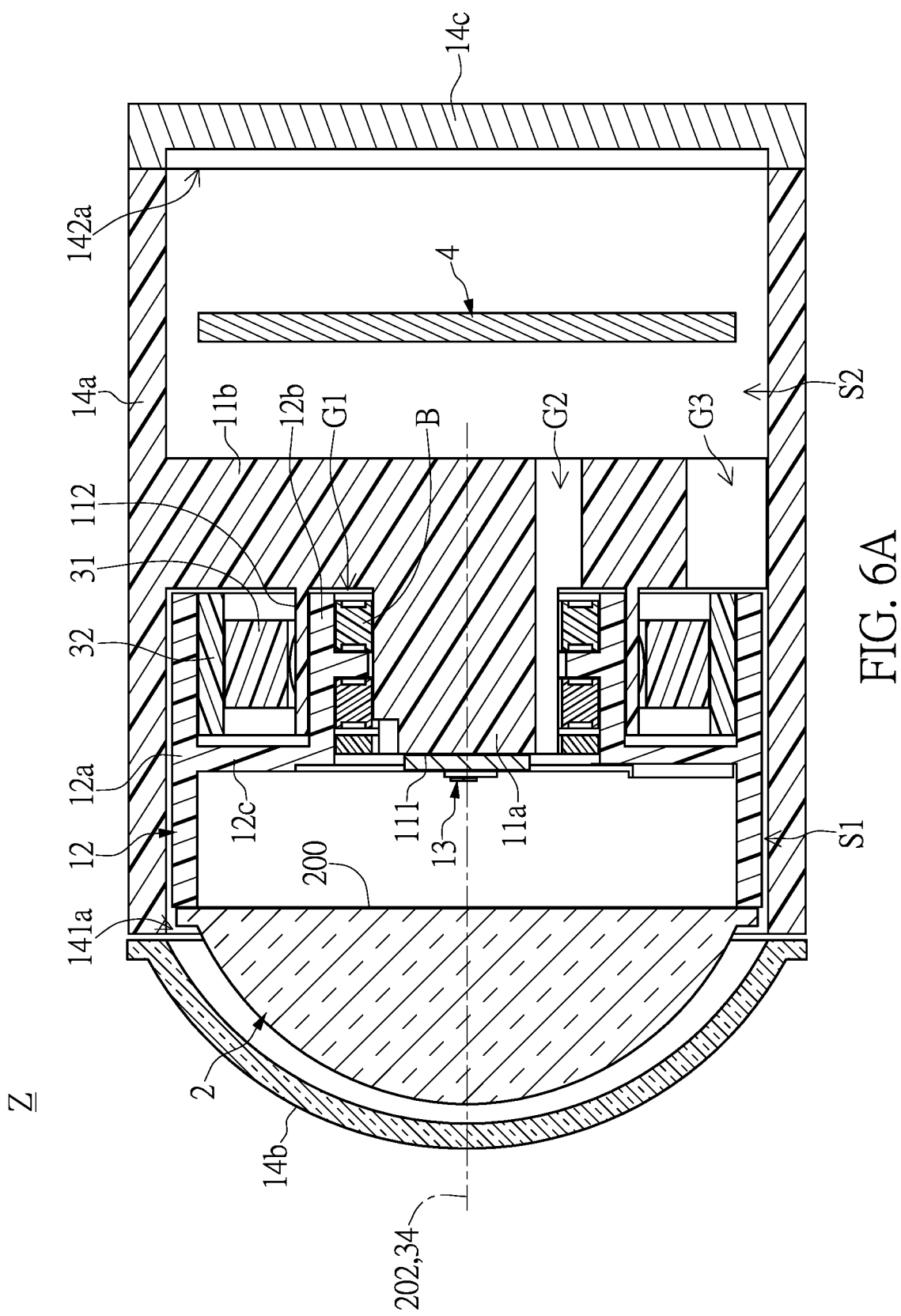
FIG. 6A is a sectional schematic view of the first implementation of the adaptive vehicle headlight according to the first embodiment of the present disclosure.

In one implementation of the present embodiment, as shown in FIG. 6A, the base 11 is configured to divide an internal space of the light body 1 into a first space S1 and a second space S2. The carrying portion 11a, the rotating member 12, the light emitting unit 13, the optical lens 2, and the driver 13 are all located in the first space S1. The control unit 4 is located in the second space S2. More specifically, the carrying portion 11a has a first carrying surface 111. The first carrying surface 111 can be opposite to a light input surface 200 of the optical lens 2, and preferably opposite to and parallel to the light input surface 200 of the optical lens 2. The light emitting unit 13 is arranged on the first carrying surface 111 to emit the illumination light beam directly toward the light input surface 200 of the optical lens 2. The rotating member 12 is arranged to surround the carrying portion 11a, in which a rotation axis 34 coincides with a central axis of the carrying portion 11a. The driver 3 is arranged between the rotating member 12 and the carrying portion 11a, and can drive the rotating member 12 in a non-contact manner (e.g., applying a non-contact force), so as to allow the rotating member 12 to synchronously rotate with the optical lens 2. The above description is for exemplary purposes only and is not intended to limit the scope of the present disclosure.

In practice, the base 11 can further has a spacing portion 11b, and the internal space of the light body 1 can be divided into the first space S1 and the second space S2 by the spacing portion 11b. The carrying portion 11a can be formed to extend from the spacing portion 11b. The rotating member 12 can include an outer frame portion 12a, an inner frame portion 12b, and a wall portion 12c. The outer frame portion 12a and the inner frame portion 12b can be spaced apart from each other in an up-down direction. The wall portion 12c can be connected between the outer frame portion 12a and the inner frame portion 12b, and the first carrying surface 111 of the carrying portion 11a is exposed from the wall portion 12c. The optical lens 2 can be fixed to the outer frame portion 12a. The optical lens 2 can be an asymmetric optical lens, in which curvatures in the horizontal direction and the vertical direction are different from each other. The driver 3 can be a brushless pan/tilt motor and includes a coil structure 31 and a magnetic body 32. The coil structure 31 and the magnetic body 32 can be arranged between the outer frame portion 12a, the inner frame portion 12b, and the wall portion 12c and at a certain distance from each other. The coil structure 31 can be composed of iron cores with coils, and the magnetic body 32 can be formed from one or more magnets. The control unit 4 can include a control printed circuit board (PCB) and a tilt sensor (not shown), and at least has control functions of the light emitting unit 13 and the driver 3.

Figure 4:
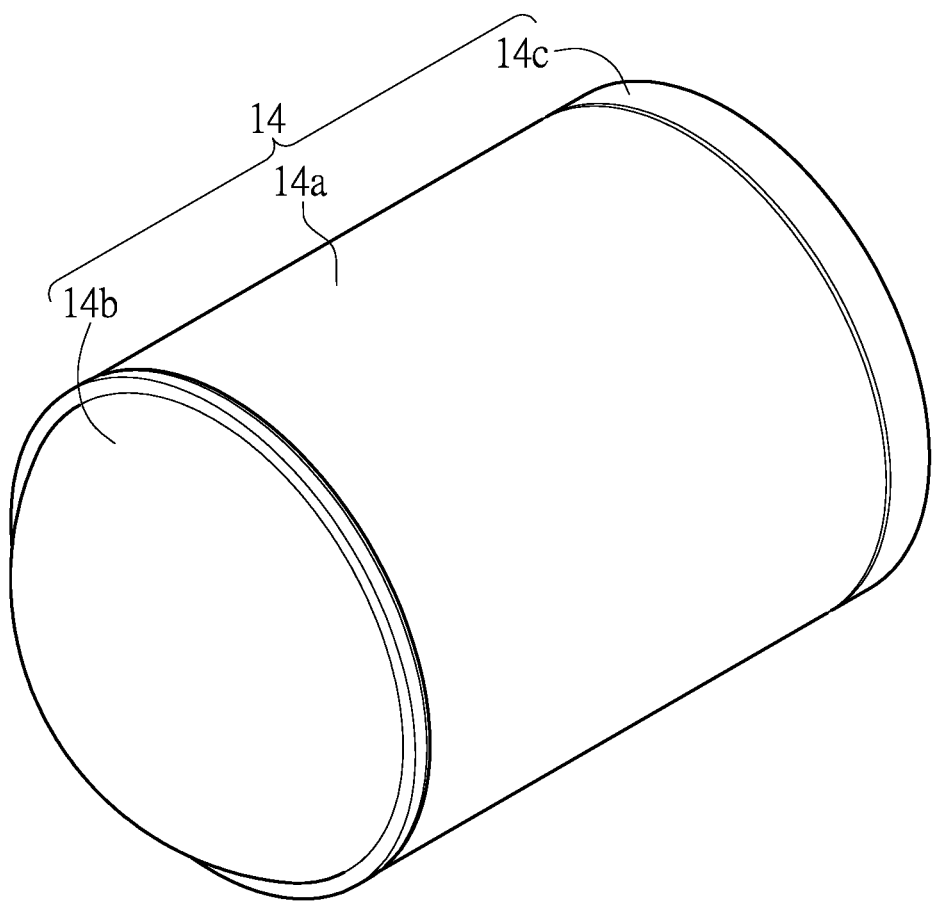
FIG. 4 is a perspective assembled view of a first implementation of an adaptive vehicle headlight according to a first embodiment of the present disclosure.
Figure 5:
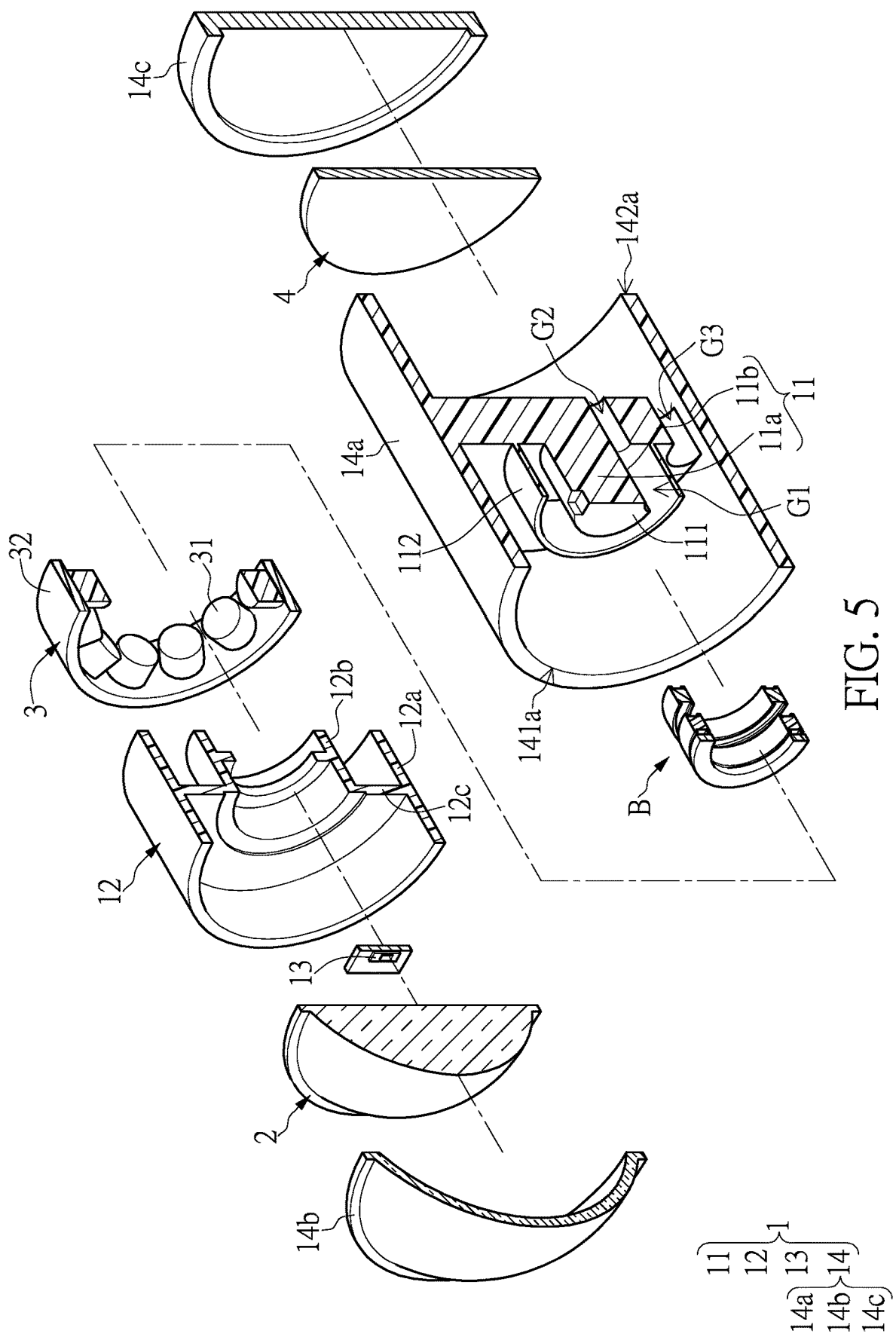
FIG. 5 is a perspective, exploded, and sectional view of the first implementation of the adaptive vehicle headlight according to the first embodiment of the present disclosure.

Furthermore, as shown in FIG. 4 and FIG. 6A, an external structure 14 of the light body 1 includes a housing 14a, a light cover 14b, and a back lid 14c. The housing 14a has a first open end 141a and a second open end 142a opposite to the first open end 141, the shape of which is not limited to a cylindrical shape. The base 11 can be integrally formed inside the housing 14a. The light cover 14b is assembled to the first open end 141a of the housing 14a, and the light cover 14b, one portion (e.g., a front portion) of the housing 14a, and the base 11 jointly define the first space S1. The back lid 14c is assembled to the second open end 142a of the housing 14a, and the back lid 14c and another one portion (e.g., a rear portion) of the housing 14a jointly define the second space S2.

In addition, as shown in FIG. 6A, the carrying portion 11a of the base 11 can have a first wire groove G2 for passing wire(s) outwardly from the light emitting unit 13. The spacing portion 11b of the base 11 can have a second wire groove G3 for passing wire(s) outwardly from the coil structure 31. Therefore, these wires cannot be interfered with mechanical parts, so that the headlight can work normally for a long period of time.

Figure 6B:
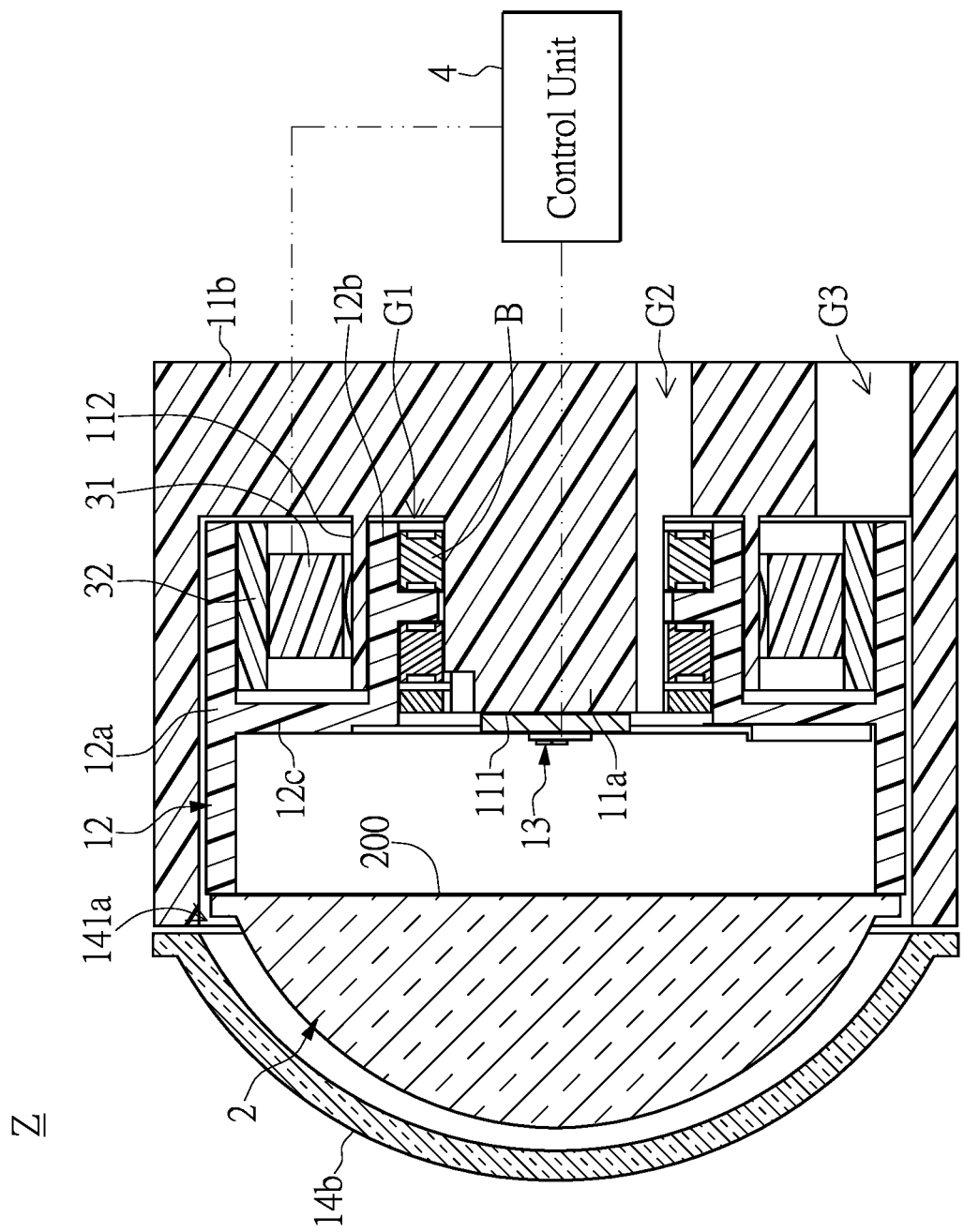
FIG. 6B is a sectional schematic view of a modified example of the first implementation of the adaptive vehicle headlight according to the first embodiment of the present disclosure.

In certain embodiments, depending on cost considerations or different use requirements, the control unit 4 can be arranged at the outside of the light body 1 and electrically connected to the light emitting unit 13 and the driver 3 (e.g., the coil structure 31 of the driver 3), as shown in FIG. 6B. In addition, the light cover 14b can be omitted for cost saving.

In order to neatly and compactly integrate the base 11 with the rotating member 12 and the driver 3, the carrying portion 11a can have an accommodating groove G1, and the inner frame portion 12b of the rotating member 12 and a bearing B can be jointly disposed in the accommodating groove G1, in which the inner frame portion 12b is supported by the bearing B. Furthermore, the carrying portion 11a can further have a second carrying surface 112 located outside of the accommodating groove G1 and perpendicular to the first carrying surface 111. The coil structure 31 can be fixed to the second carrying surface 112 of the carrying portion 11a, and the magnetic body 32 can be fixed to the outer frame portion 12a of the rotating member 12. Accordingly, the coil structure 31 and the magnetic body 32 can work with each other to produce an electromagnetic torque, thereby allowing the rotating member 12 to rotate in a clockwise or counterclockwise direction.

Figure 7:
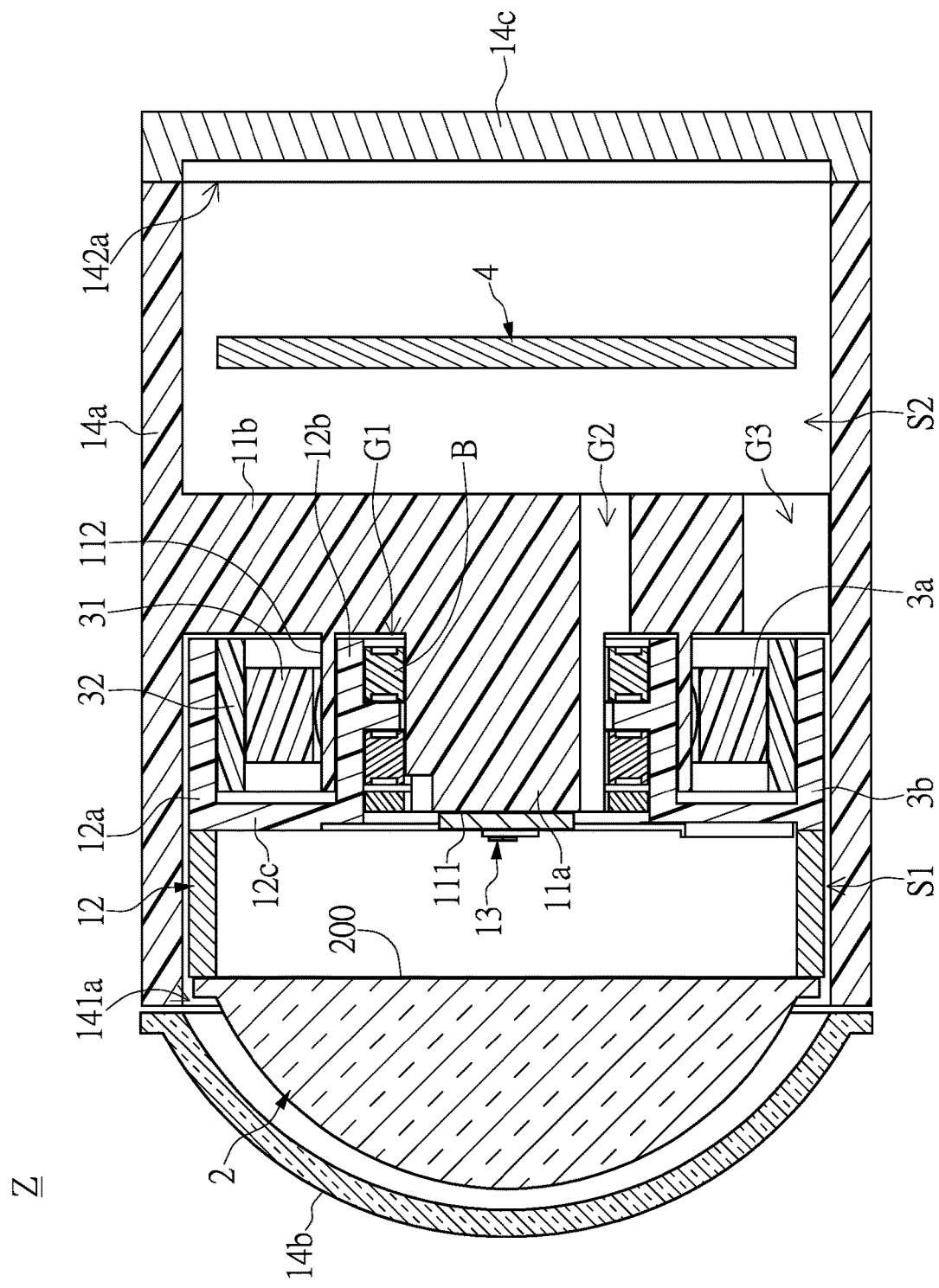
FIG. 7 is a sectional schematic view of a second implementation of the adaptive vehicle headlight according to the first embodiment of the present disclosure.

Referring to FIG. 7, depending on particular requirements, a portion of the rotating member 12 can be independently detached to become a portion of the driver 3. More specifically, the driver 3 includes a stator portion 3a and a rotor portion 3b. The stator portion 3a includes a coil structure 31. The rotor portion 3b includes a magnetic body 32 and is connected to the rotating member 12. Accordingly, when coils in the coil structure 31 are energized, the rotor portion 3b can drive the rotating member 12 to synchronously rotate with the optical lens 2.

Figure 8:
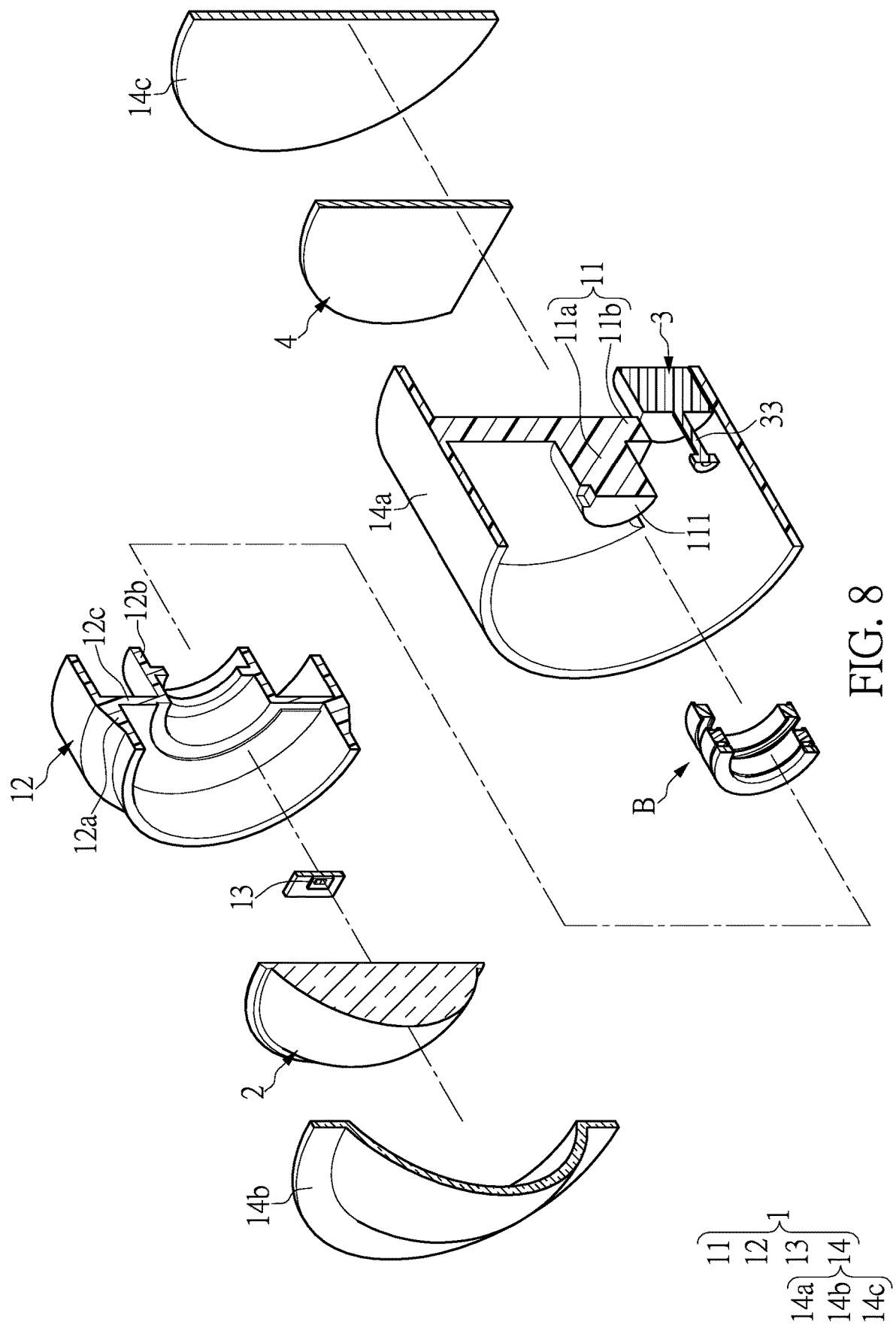
FIG. 8 is a perspective exploded sectional view of the second implementation of the adaptive vehicle headlight according to the first embodiment of the present disclosure.
Figure 9:
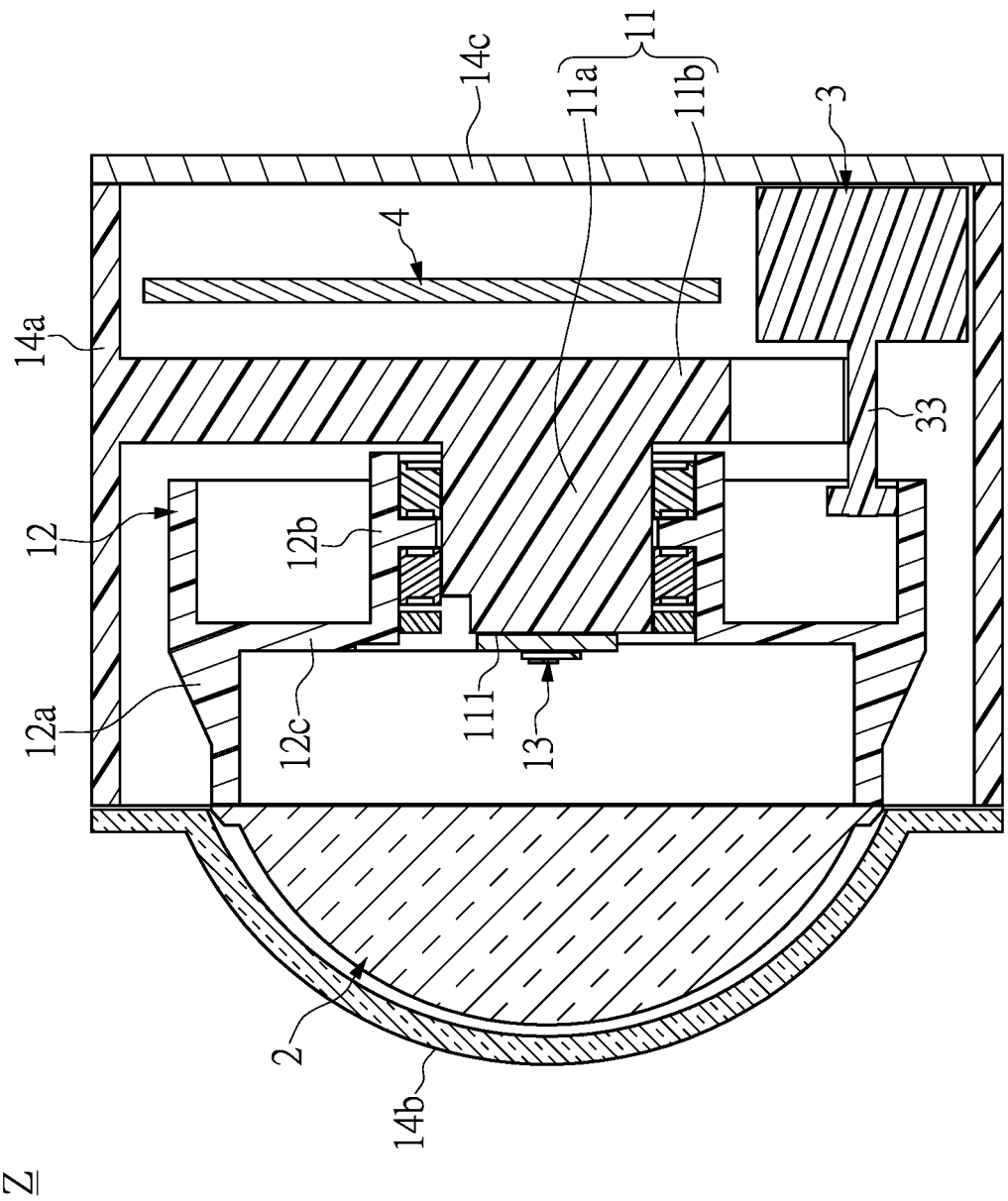
FIG. 9 is a sectional schematic view of the second implementation of the adaptive vehicle headlight according to the first embodiment of the present disclosure.

Referring to FIG. 8 and FIG. 9, in another one implementation of the present embodiment, the driver 3 can be a stepper motor that is arranged in the second space S2 of the light body 1 and has a driving structure 33 (e.g., a driving shaft) extending from the second space S2 to the first space S1 to be transmittingly connected to rotating member 12. In practice, a front end of the driving structure 33 can be connected to the rotating member 12 via a gear set (not shown) that can be composed of a plurality of gears with different diameters. Accordingly, the driving structure 33 being rotated can drive the rotating member 12 to rotate on the carrying portion 11a by the gear set. That is, the rotational movement of the driving structure 33 can be converted into the rotational movement of the rotating member 12 by the gear set.

It should be noted that, when a stepper motor is used as the driver 3, the driver 3 can be arranged outside of the light body 1 and connected to the rotating member 12 located in the light body 1 via the driving structure 33, such that the rotating member 12 can be rotated to the left or right.

Figure 10:
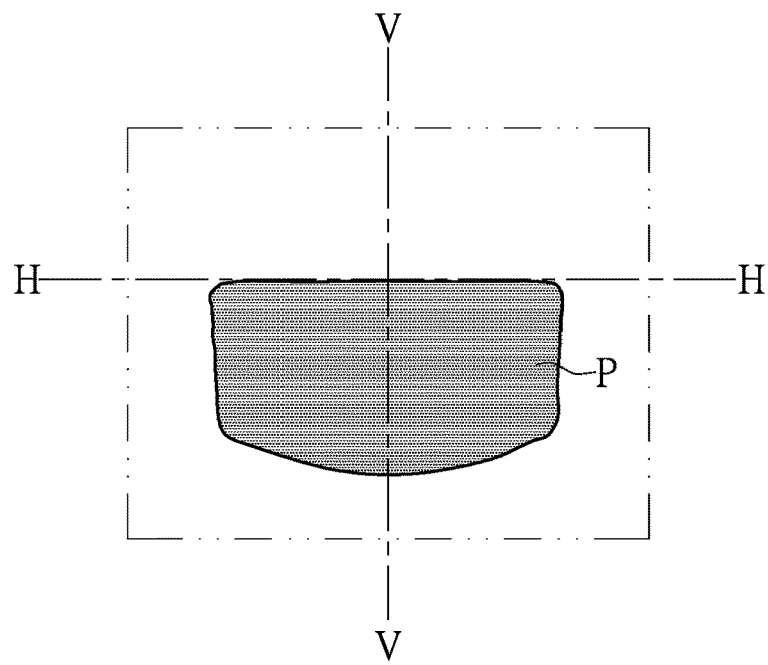
FIG. 10 to FIG. 14 show low beam illumination patterns produced by the adaptive vehicle headlight according to the first embodiment of the present disclosure, in which a vehicle body is in a tilted or non-tilted state.
Figure 13:
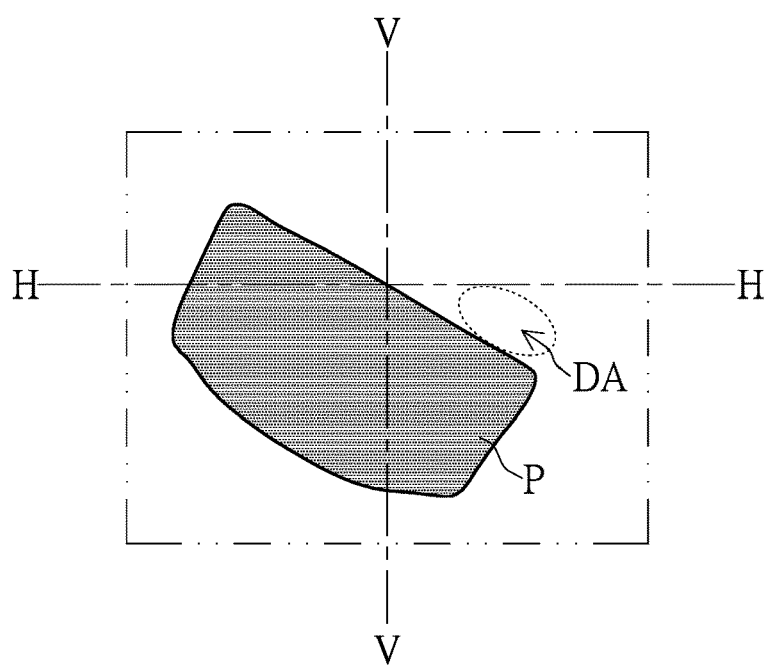
Figure 14:
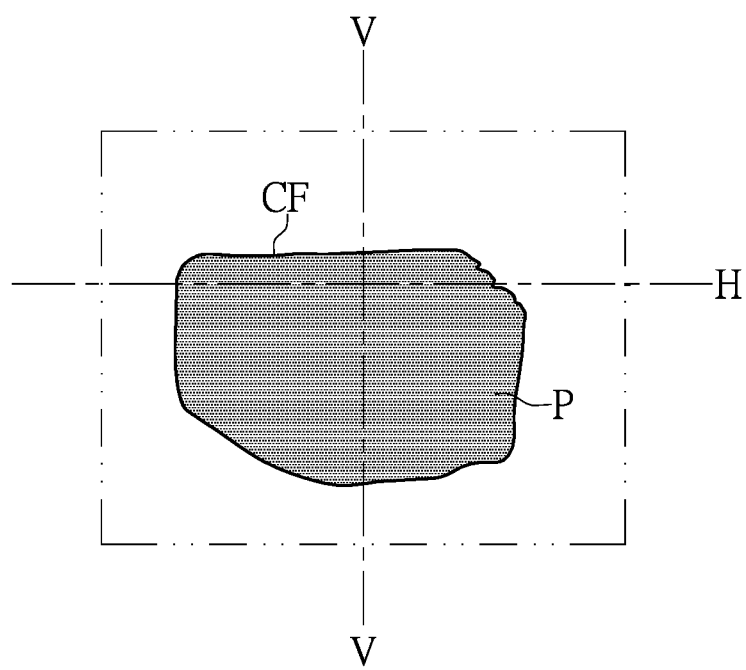
Figure 15:
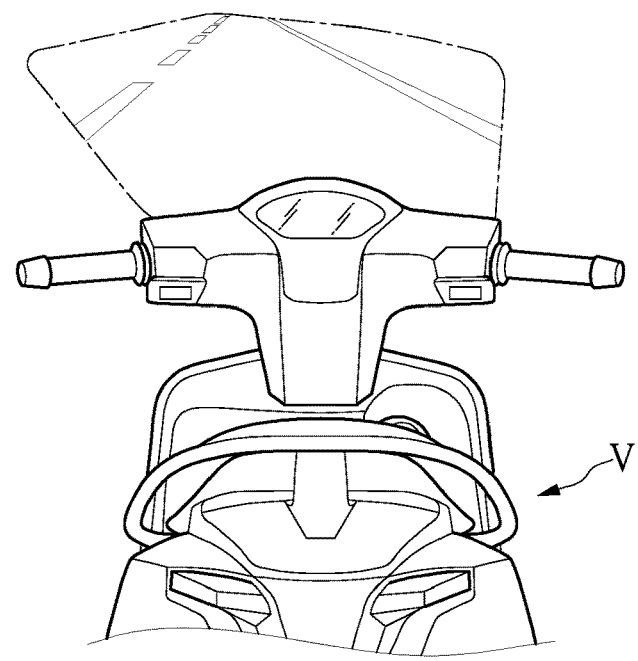
FIG. 15 to FIG. 19 are schematic views showing road illumination of the adaptive vehicle headlight according to the first embodiment of the present disclosure, in which the vehicle body is in a tilted or non-tilted state.

Reference is made to FIG. 10 to FIG. 19. The adaptive vehicle headlight Z of the present disclosure can provide sufficient front illumination for a vehicle (e.g., a two-wheeled vehicle) when driving, so as to reduce or even eliminate blind areas BA of vision in front of the vehicle. The detailed descriptions are as follows. When the vehicle is running on a straight road, no rotation is required for the optical lens 2 since a vehicle body V is maintained perpendicular to a road surface. Thus, an illumination pattern P produced by the adaptive vehicle headlight Z will be in a horizontal state, as shown in FIG. 10. Therefore, no blind areas of vision are present in front of the vehicle, as shown in FIG. 15.

Figure 11:
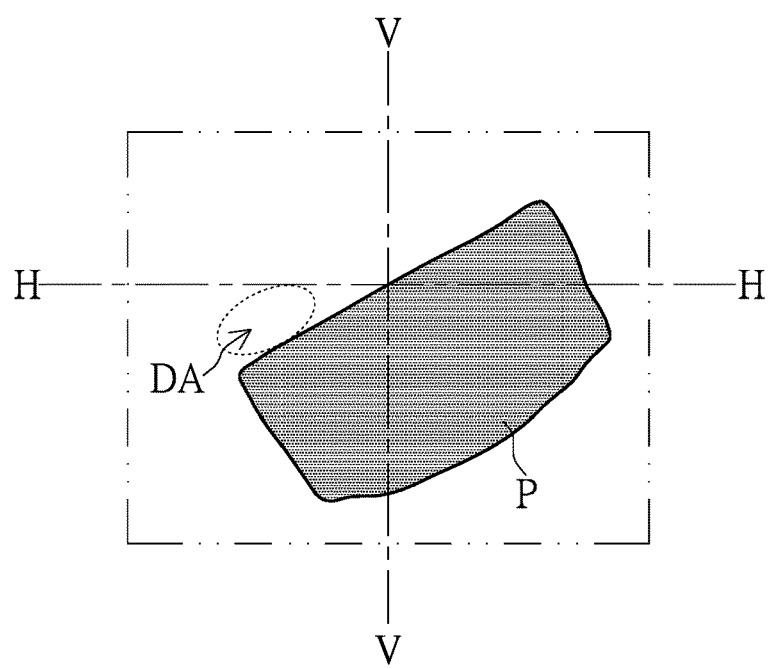
Figure 12:
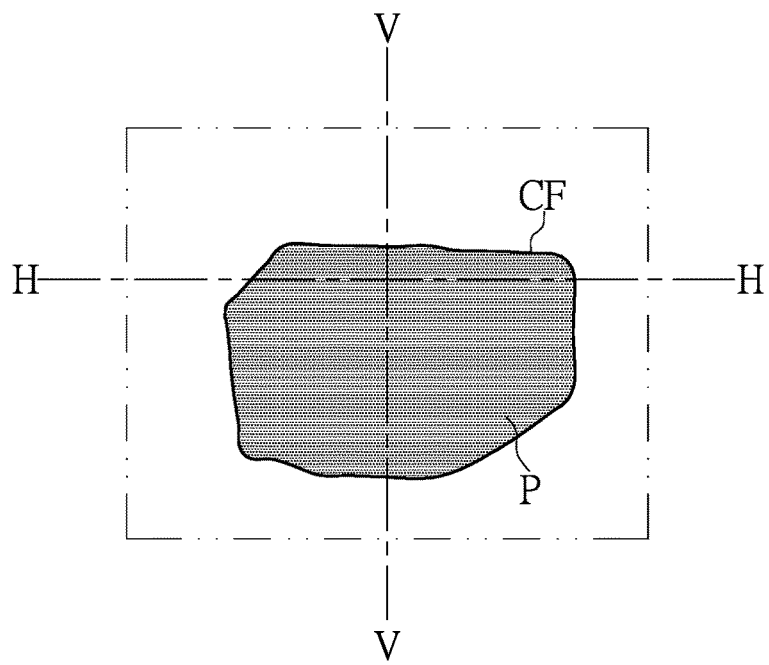
Figure 16:
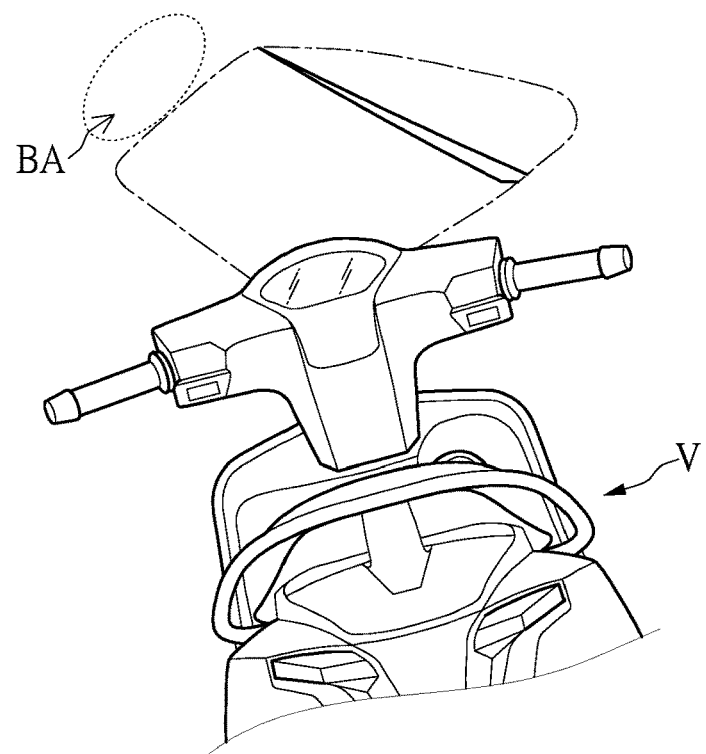
Figure 17:
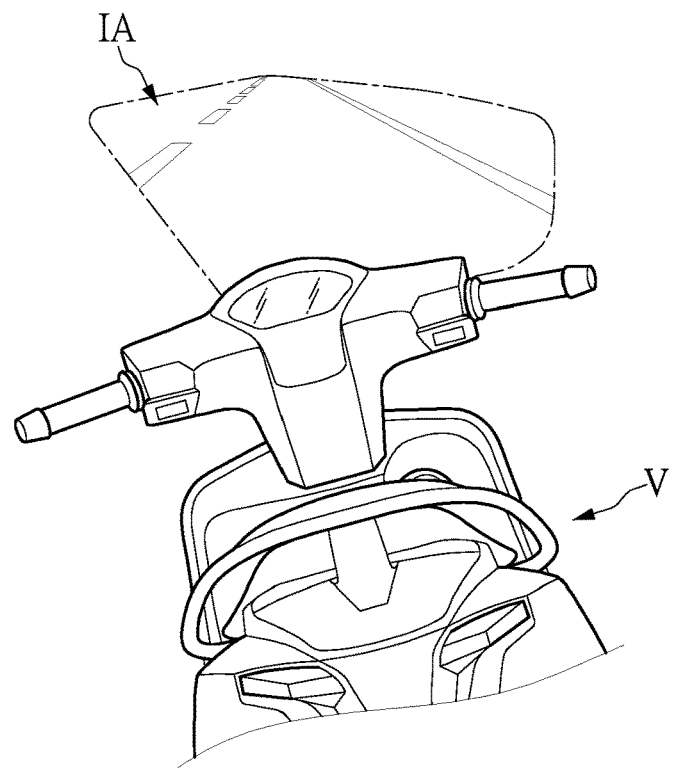

When the vehicle is running on a left curved road, the vehicle body V leans to the left at an angle relative to a road surface. At this time, if the optical lens 2 does not rotate, an illumination pattern P produced by the adaptive vehicle headlight Z would be tilted left, as shown in FIG. 11, in which a dark area DA is present at the left side of the V-V line and below the H-H line. Therefore, a blind area BA of vision is present at the front left of the vehicle, as shown in FIG. 16. In contrast, in the present disclosure, the optical lens 2 can be driven by the rotating member 2 to rotate left by a predetermined angle (i.e., rotate in a clockwise direction viewing from the driver), such that the illumination pattern P is still maintained in the horizontal state and there is a light distribution above the H-H line, as shown in FIG. 12. Therefore, an auxiliary illumination zone IA can be produced to eliminate the blind area of vision at the front left of the vehicle, as shown in FIG. 17.

Figure 18:
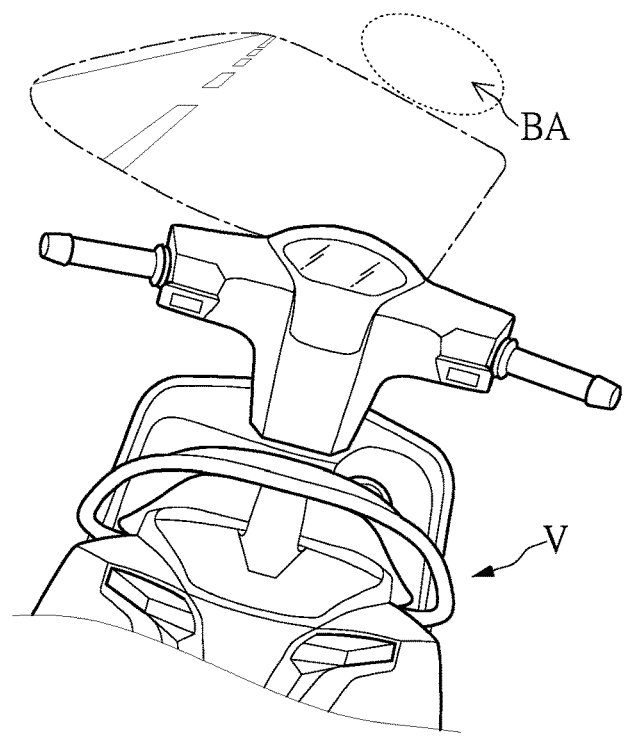
Figure 19:
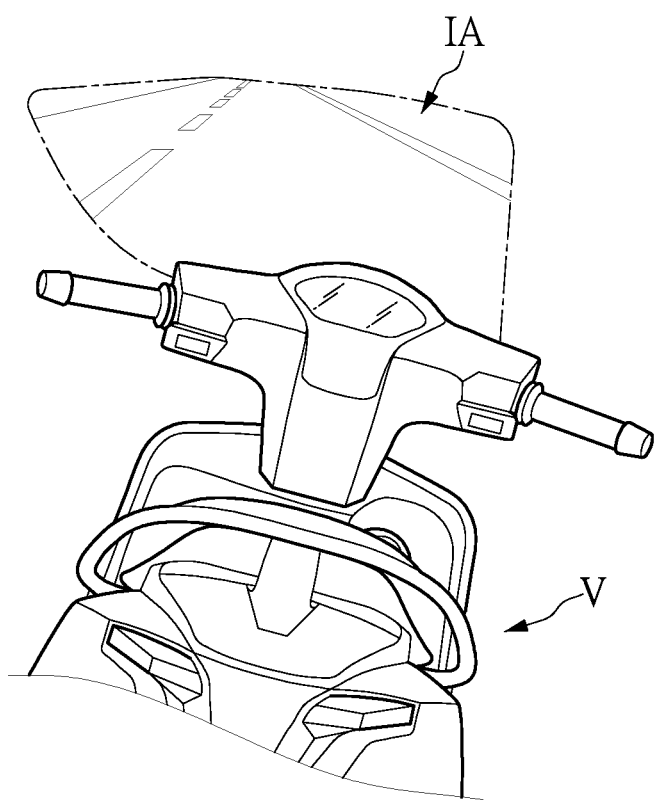

When the vehicle is running on a right curved road, the vehicle body V leans to the right at an angle relative to a road surface. At this time, if the optical lens 2 does not rotate, an illumination pattern P produced by the adaptive vehicle headlight Z would be tilted right, as shown in FIG. 13, in which a dark area DA is present at the right side of the V-V line and below the H-H line. Therefore, a blind area BA of vision is present at the front right of the vehicle, as shown in FIG. 18. In contrast, in the present disclosure, the optical lens 2 can be driven by the rotating member 2 to rotate right by a predetermined angle (i.e., rotate in a counterclockwise direction viewing from the driver), such that the illumination pattern P is still maintained in the horizontal state and there is a light distribution above the H-H line, as shown in FIG. 14. Therefore, an auxiliary illumination zone IA can be produced to eliminate the blind area of vision at the front left of the vehicle, as shown in FIG. 19.

Figure 20:
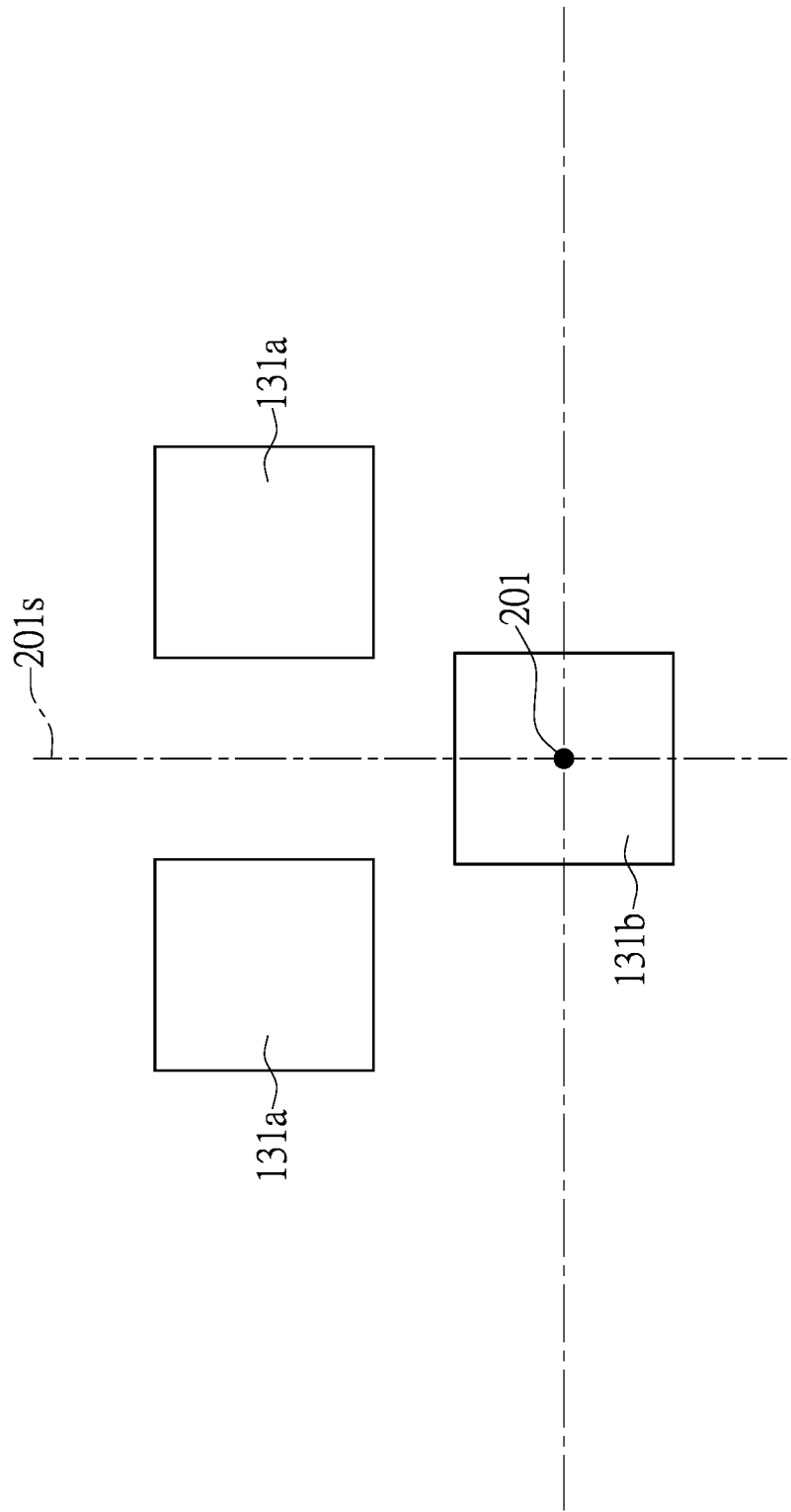
FIG. 20 is a schematic view showing an arrangement of a light emitting unit of the adaptive vehicle headlight according to the first embodiment of the present disclosure.
Figure 21:
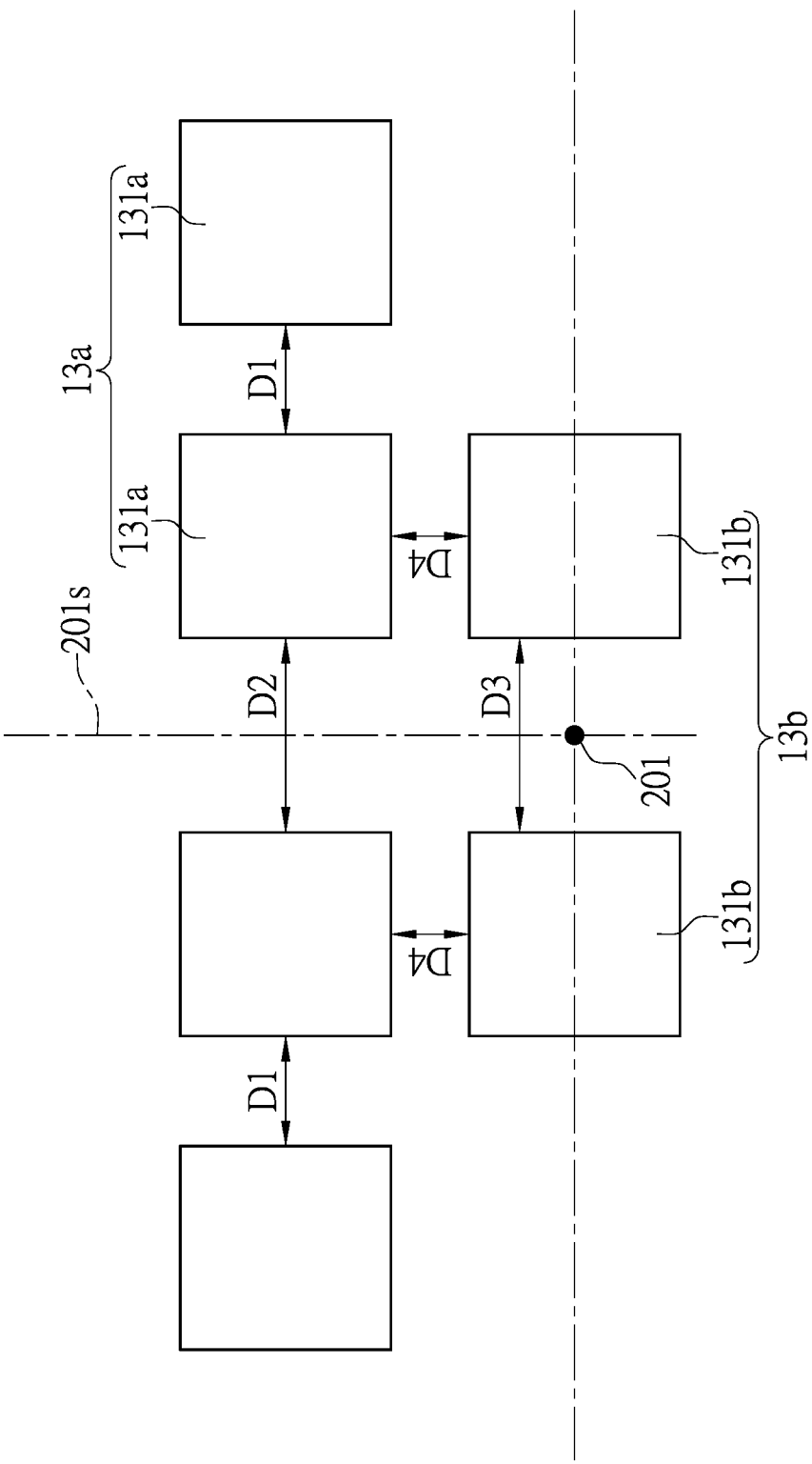
FIG. 21 is a schematic view showing another arrangement of the light emitting unit of the adaptive vehicle headlight according to the first embodiment of the present disclosure.

Reference is made to FIG. 20 and FIG. 21. In the present embodiment, the light emitting unit 13 can include a first light emitting unit 13a and a second light emitting unit 13b, and can further include one or more wavelength converting layers (e.g., fluorescent layers, not shown in FIG. 20) covering the first light emitting unit 13a and the second light emitting unit 13b if necessary, so as to produce optical characteristics required for practical implementations. The light emitting unit 13 can be mounted on a circuit substrate, and it can be an LED package structure, but is not limited thereto. The first light emitting unit 13a and the second light emitting unit 13b are arranged in proximity to a lens focus 201, and the first light emitting unit 13a is arranged above the second light emitting unit 13b. The first light emitting unit 13a can include at least two first LED chips 131a. The second light emitting unit 13b can include at least one second LED chip 131b. An illumination light beam emitted from the first light emitting unit 13a that is lighted up can be projected outwardly through the optical lens 2 to produce a low beam illumination pattern. An illumination light beam emitted from the first light emitting unit 13a and the second light emitting unit 13b that are lighted up at the same time can be projected outwardly through the optical lens 2 to produce a high beam illumination pattern. The above description is for exemplary purposes only and is not intended to limit the scope of the present disclosure.

More specifically, in a structure with two first LED chips 131a and a second light emitting unit 13b, the two first LED chips 131a can be arranged above the lens focus 201 and symmetrically distributed at left and right sides of a vertical symmetry plane 201s passing through the lens focus 201. The second light emitting unit 13b can be arranged at the lens focus 201. In use, in a situation where the optical lens 2 does not rotate, the two first LED chips 131a can be lighted up in a low beam mode, and the two first LED chips 131a and the second light emitting unit 13b can be lighted up in a high beam mode.

In a situation where the optical lens 2 rotates to the left, all or the left one of the two first LED chips 131a can be lighted up in a low beam mode. It should be noted that, when all of the two first LED chips 131a are lighted up, a resulting illumination pattern P would have an amount of light spilling beyond the H-H line, i.e., a cut-off line CF of the resulting illumination pattern P would be located above the H-H line, as shown in FIG. 12. When only the left one of the two first LED chips 131a is lighted up, the amount of light spilling would be eliminated, i.e., the cut-off line CF of the resulting illumination pattern P would be located below and close to the H-H line. In addition, in a high beam mode, the two first LED chips 131a and the second light emitting unit 13b can be lighted up, or the left one of the two first LED chips 131a and the second light emitting unit 13b can be lighted up.

In a situation where the optical lens 2 rotates to the right, all or the right one of the two first LED chips 131a can be lighted up in a low beam mode. It should be noted that, when all of the two first LED chips 131a are lighted up, a resulting illumination pattern P would have an amount of light spilling beyond the H-H line, i.e., a cut-off line CF of the resulting illumination pattern P would be located above the H-H line, as shown in FIG. 14. When only the right one of the two first LED chips 131a is lighted up, the amount of light spilling would be eliminated, i.e., the cut-off line CF of the resulting illumination pattern P would be located below and close to the H-H line. In addition, in a high beam mode, the two first LED chips 131a and the second light emitting unit 13b can be lighted up, or the right one of the two first LED chips 131a and the second light emitting unit 13b can be lighted up.

In some applications, in order to increase illumination brightness, the first light emitting unit 13a includes four first LED chips 131a and the second light emitting unit 13b includes two second LED chips 131b. The four first LED chips 131a can be arranged above the lens focus 201 and symmetrically distributed in pairs at left and right sides of a vertical symmetry plane 201s. The two second LED chips 131b correspond in position to the lens focus 201 and symmetrically distributed at left and right sides of the vertical symmetry plane 201s. Furthermore, the two second LED chips 131b are respectively aligned with the middle two of the four first LED chips 131a in the up-down direction. In use, in a situation where the optical lens 2 does not rotate, all or the middle two of the four first LED chips 131a can be lighted up in a low beam mode. In a high beam mode, the four first LED chips 131a and the two second LED chips 131b can be lighted up, or the middle two of the four first LED chips 131a and the two second LED chips 131b can be lighted up.

In a situation where the optical lens 2 rotates to the left, in a low beam mode, all of the four first LED chips 131a can be lighted up, or the first one or two of the four first LED chips 131a located at the left side of the vertical symmetry plane 201s can be lighted up. When all of the four first LED chips 131a are lighted up, a resulting illumination pattern P would have an amount of light spilling beyond the H-H line, i.e., a cut-off line CF of the resulting illumination pattern P would be located above the H-H line, as shown in FIG. 12. When the first one or two of the four first LED chips 131a located at the left side of the vertical symmetry plane 201s are lighted up, the amount of light spilling would be eliminated, i.e., the cut-off line CF of the resulting illumination pattern P would be located below and close to the H-H line. In addition, in a high beam mode, the four first LED chips 131a and the two second LED chips 131b can be lighted up, or the first one or two of the four first LED chips 131a located at the left side of the vertical symmetry plane 201s and the two second LED chips 131b can be lighted up.

In a situation where the optical lens 2 rotates to the right, in a low beam mode, all of the four first LED chips 131a can be lighted up, or the first one or two of the four first LED chips 131a located at the right side of the vertical symmetry plane 201s can be lighted up. When all of the four first LED chips 131a are lighted up, a resulting illumination pattern P would have an amount of light spilling beyond the H-H line, i.e., a cut-off line CF of the resulting illumination pattern P would be located above the H-H line, as shown in FIG. 14. When the first one or two of the four first LED chips 131a located at the right side of the vertical symmetry plane 201s are lighted up, the amount of light spilling would be eliminated, i.e., the cut-off line CF of the resulting illumination pattern P would be located below and close to the H-H line. In addition, in a high beam mode, the four first LED chips 131a and the two second LED chips 131b can be lighted up, or the first one or two of the four first LED chips 131a located at the right side of the vertical symmetry plane 201s and the two second LED chips 131b can be lighted up.

Preferably, two of the four first LED chips 131a located at the left or right side of the vertical symmetry plane 201s has a first spacing D1 therebetween. The middle two of the four first LED chips 131a has a second spacing D2 therebetween. The two second LED chips 131b has a third spacing D3 therebetween, and a fourth spacing D4 is present between each of the two second LED chips 131b and the corresponding one of the two second LED chips 131b. The first spacing D1, the second spacing D2, the third spacing D3, and the fourth spacing D4 satisfy the equations (1) to (4):

$$0 < \text{First spacing } D1 \leq 1 \text{ mm} \quad \text{equation (1);}$$

$$0.01 \text{ mm} \leq \text{Second spacing } D2 \leq 2 \text{ mm} \quad \text{equation (2);}$$

$$0 < \text{Third spacing } D3 \leq 1 \text{ mm} \quad \text{equation (3);}$$

$$0 < \text{Fourth spacing } D4 \leq 1 \text{ mm} \quad \text{equation (4).}$$

In some applications, only the first light emitting unit 13a is included in the adaptive vehicle headlight Z, which can include one or more first LED chips 131a. For example, the first light emitting unit 13a can include four first LED chips 131a arranged to satisfy the equations (1) to (4). As a result, the adaptive vehicle headlight Z can only produce a low beam illumination pattern.

Second Embodiment

Referring to FIG. 22 to FIG. 29, which are to be read in conjunction with FIG. 1 to FIG. 4, a second embodiment of the present disclosure provides an adaptive vehicle headlight Z including a light body 1, an optical lens 2, a driver 3, and a control unit 4. The optical lens 2, the driver 3, and the control unit 4 are integrated into the light body 1. More specifically, the light body 1 includes a base 11, a rotating member 12, and a light emitting unit 13. The base 11 has a carrying portion 11a. The rotating member 12 is configured to rotate relative to the base 11. The light emitting unit 13 is arranged on the carrying portion 11a to emit an illumination light beam. The optical lens 2 is connected as a whole to the rotating member 12 for light distribution of the illumination light beam. That is, the illumination light beam is projected outwardly through the optical lens 2 to produce an illumination pattern having a cut-off line. The driver 3 is configured to drive the rotating member 12. The control unit 4 is configured to cause an operation of the driver 3 according to a tilt angle of a vehicle body V, such that the optical lens 2 can be driven by the rotating member 12 to rotate a predetermined angle. The necessary details of the light body 1, the optical lens 2, the driver 3, and the control unit 4 are described in the first embodiment, and will not be reiterated herein.

The main difference of the present embodiment from the first embodiment is that the light body 1 further includes a light distributing member 15 arranged between the optical lens 2 and the light emitting unit 3. It is worth mentioning that the light distributing member 15 can adjust the distribution of the illumination light beam, such that the illumination pattern can have a clearer cut-off line and contour. If the illumination pattern is a low beam illumination pattern, the cut-off line thereof is located below the H-H line (i.e., there is no light distribution above the H-H line). The light distributing member 15 can be a light shielding plate, a free end of which is not connected to other parts and has an optically effective edge (also called cut-off edge) to produce a different light distribution effect, but the present disclosure is not limited thereto.

Figure 26:
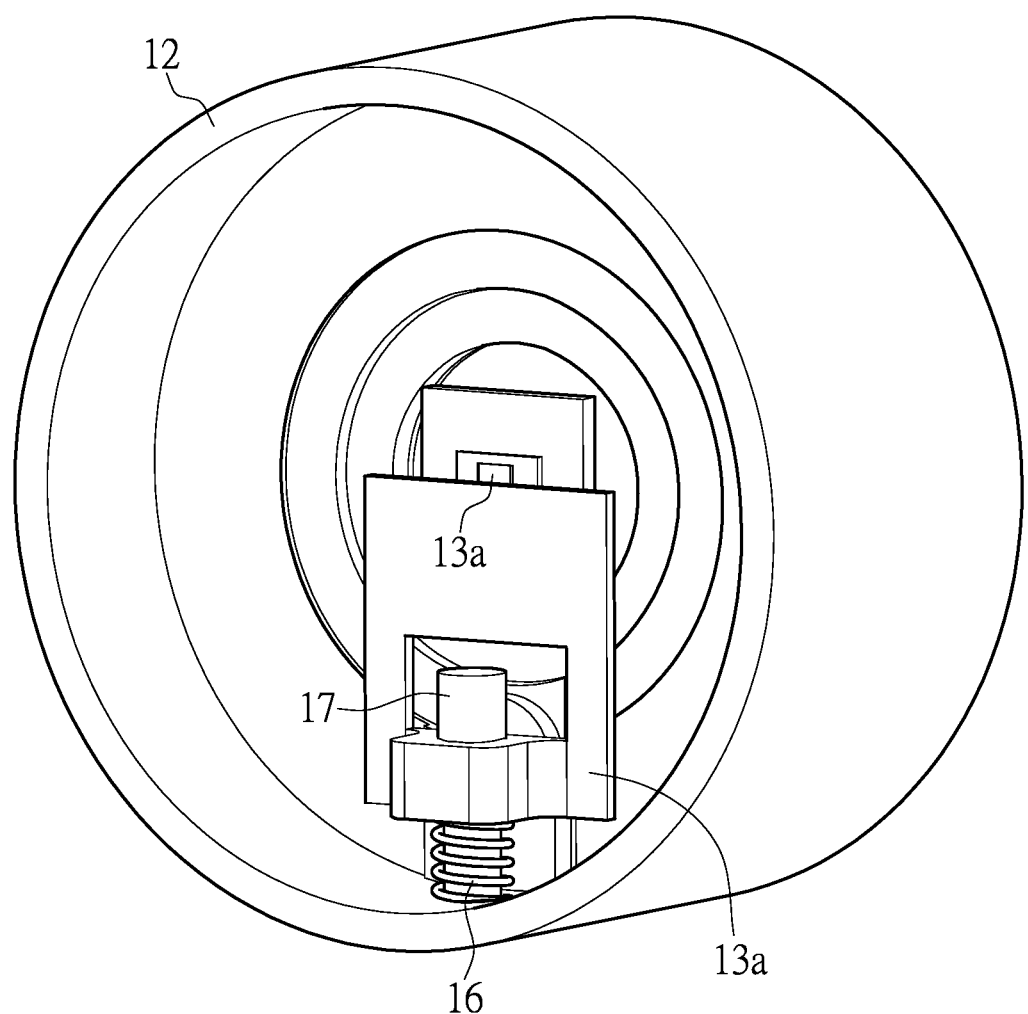
FIG. 26 is a schematic view showing a first mode of the adaptive vehicle headlight according to the second embodiment of the present disclosure, in which a light distributing member is moved to a first position through a rotation of a rotating member.
Figure 27:
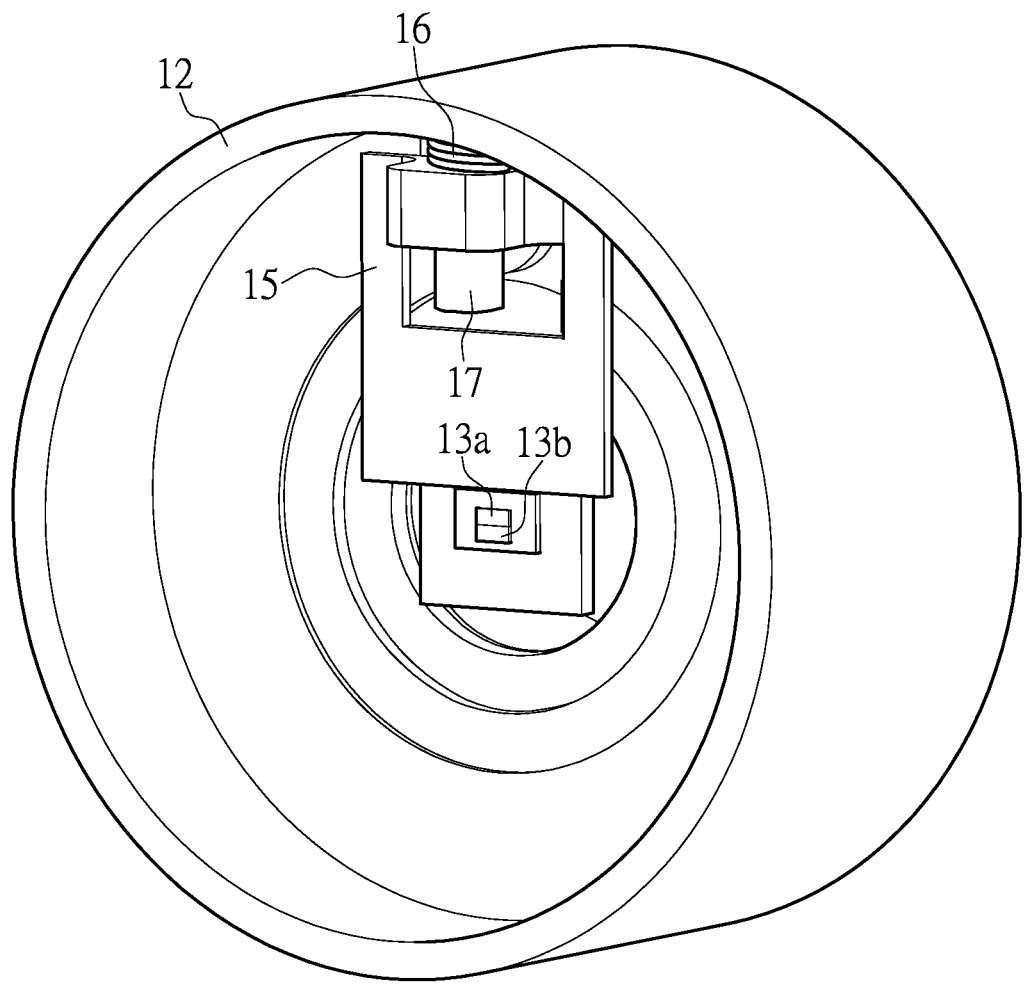
FIG. 27 is a schematic view showing a second mode of the adaptive vehicle headlight according to the second embodiment of the present disclosure, in which the light distributing member is moved to a second position through a rotation of the rotating member.

In the present embodiment, the light distributing member 15 is connected as a whole to the rotating member 12, such that it can be driven by the rotating member 12 to reciprocally move between a first position as shown in FIG. 26 and a second position as shown in FIG. 27 to selectively cover the light emitting unit 13. Accordingly, adaptive vehicle headlight Z can be switched between a low beam mode and a high beam mode. In the low beam mode, the light distributing member 15 is located at the first position. In the high beam mode, the light distributing member 15 is located at the second position.

Figure 22:
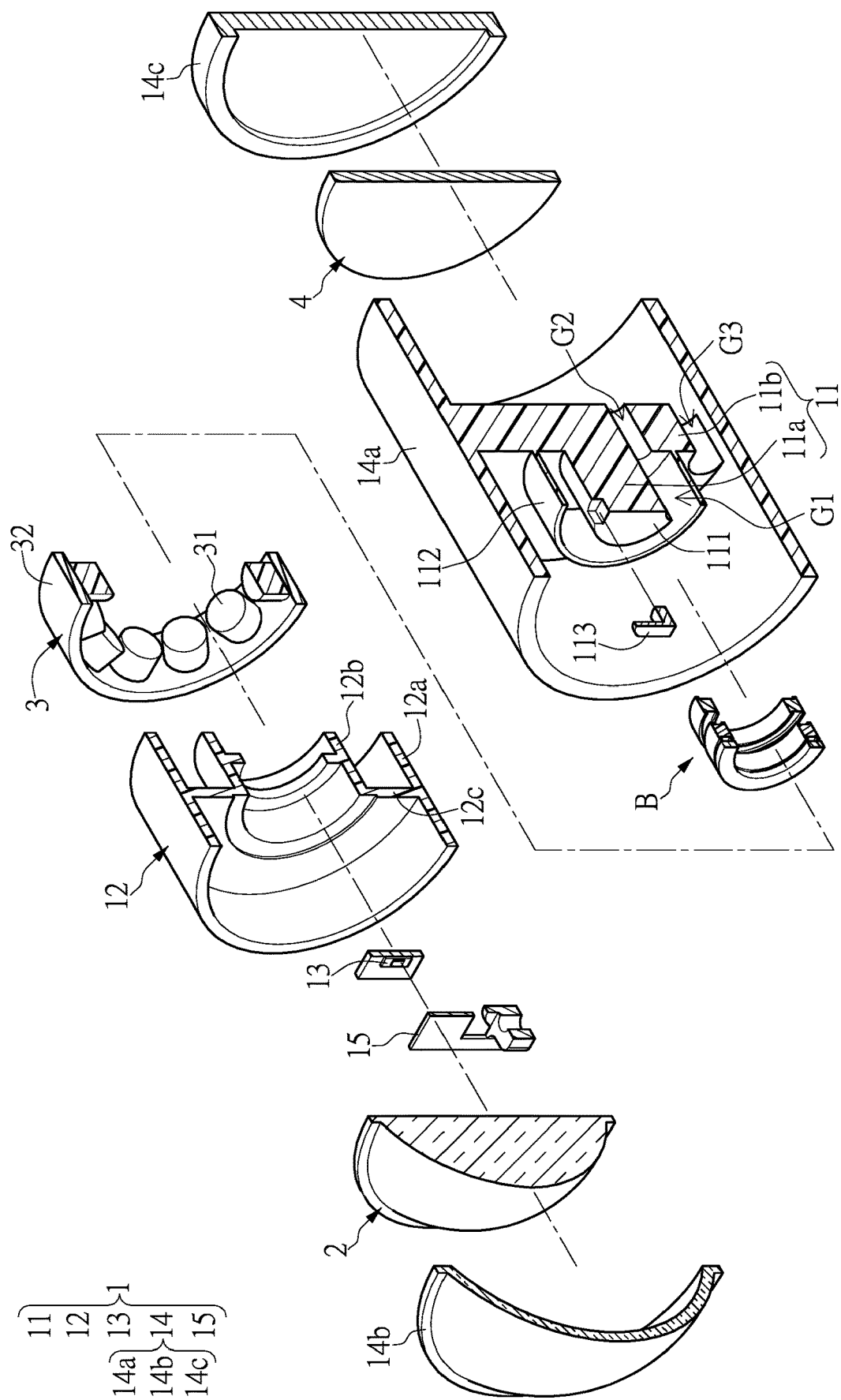
FIG. 22 is a perspective partially exploded sectional view of a first implementation of an adaptive vehicle headlight according to a second embodiment of the present disclosure.
Figure 23:
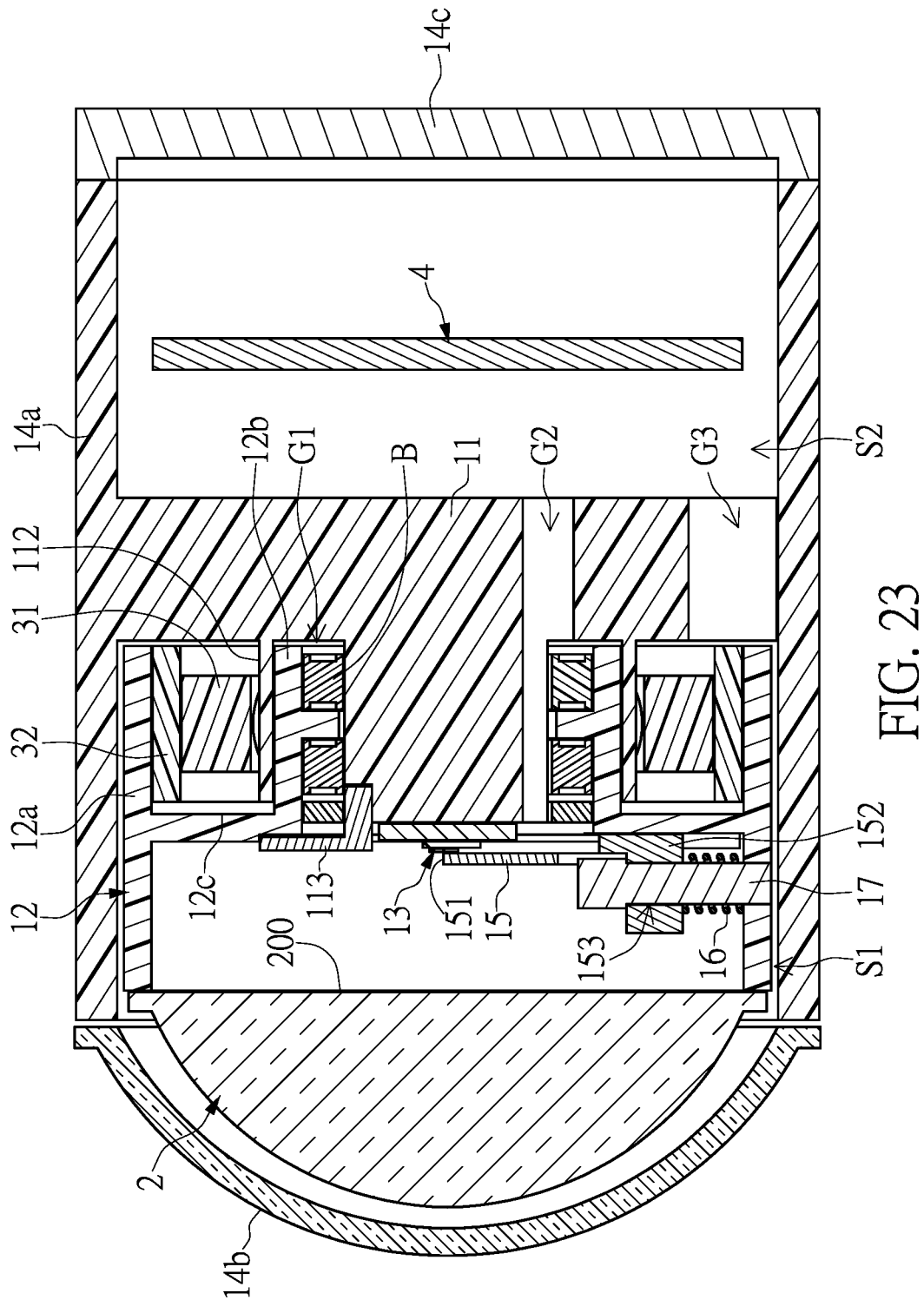
FIG. 23 is a sectional schematic view of the first implementation of the adaptive vehicle headlight according to the second embodiment of the present disclosure.

In one implementation of the present embodiment, the rotating member 12 is driven in a non-contact manner. More specifically, as shown in FIG. 22 and FIG. 23, the driver 3 can be a brushless pan/tilt motor and includes a coil structure 31 and a magnetic body 32. The coil structure 31 and the magnetic body 32 can be arranged between an outer frame portion 12a, an inner frame portion 12b, and a wall portion 12c and at a certain distance from each other. Accordingly, the coil structure 31 and the magnetic body 32 can work with each other to produce an electromagnetic torque, thereby allowing the rotating member 12 to rotate in a clockwise or counterclockwise direction. The coil structure 31 can be composed of iron cores with coils, and the magnetic body 32 can be formed from one or more magnets, but the present disclosure is not limited thereto.

Figure 24:
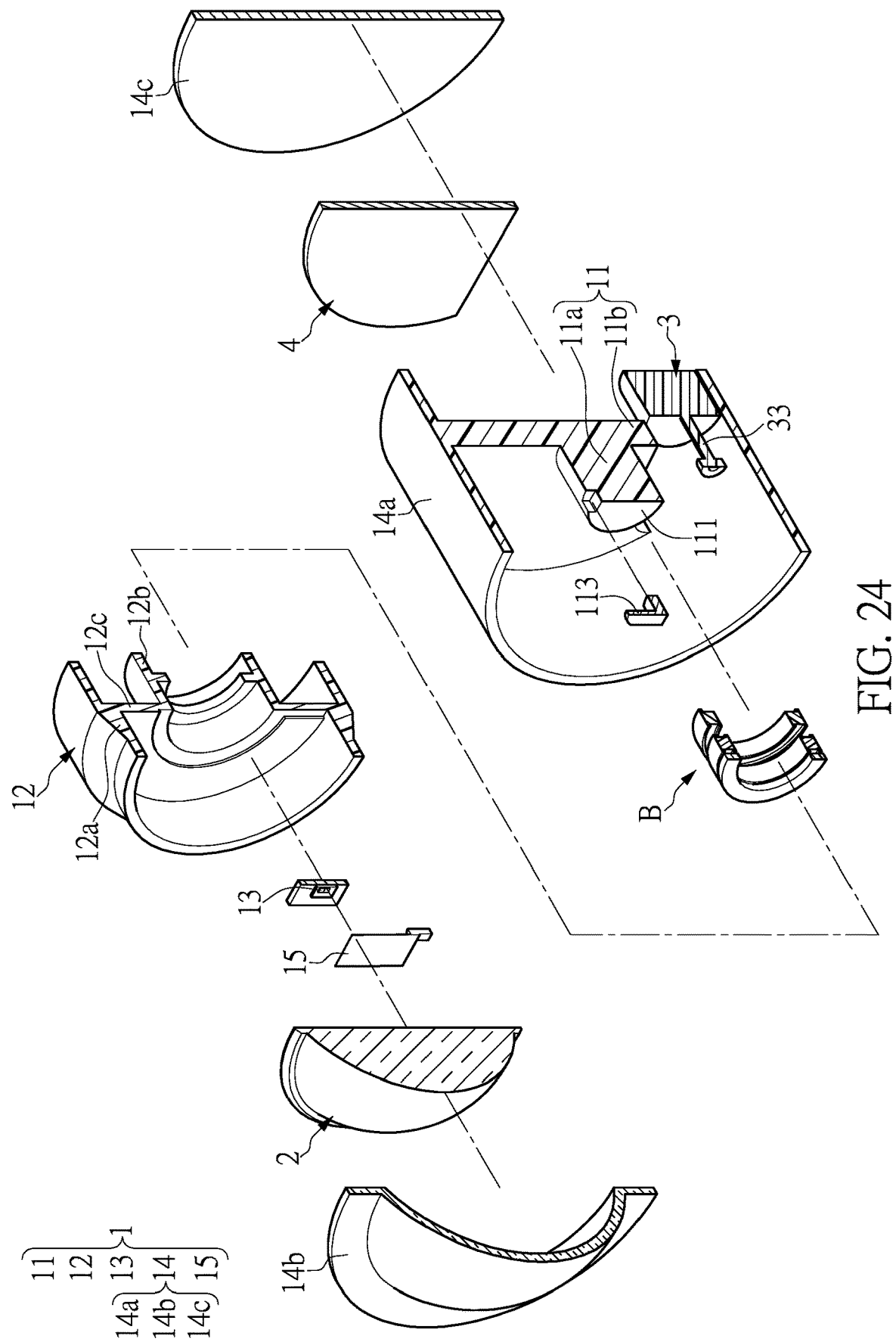
FIG. 24 is a perspective partially exploded sectional view of a second implementation of the adaptive vehicle headlight according to the second embodiment of the present disclosure.
Figure 25:
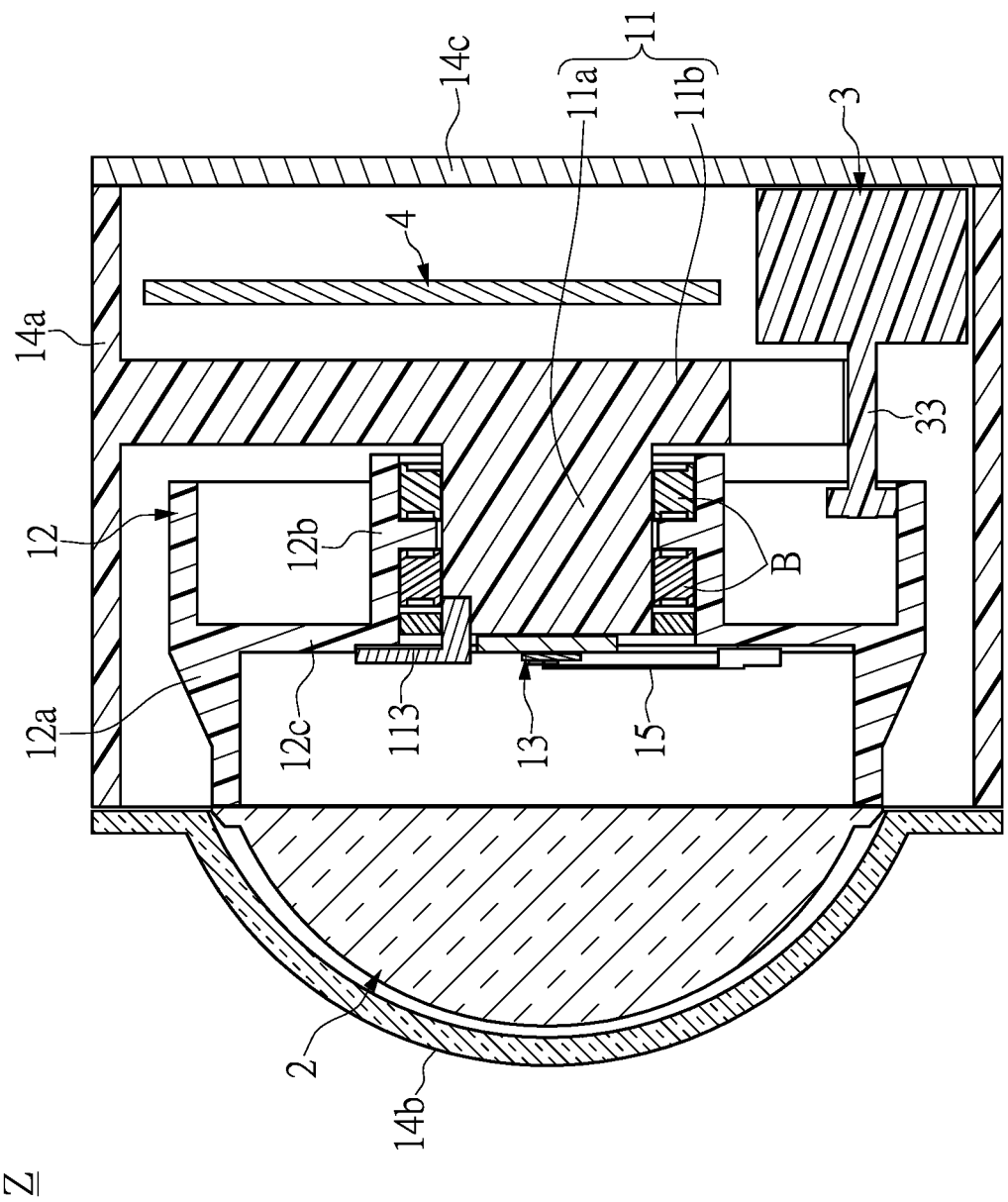
FIG. 25 is a sectional schematic view of the second implementation of the adaptive vehicle headlight according to the second embodiment of the present disclosure.

In another one implementation of the present embodiment, the rotating member 12 is driven in a direct contact manner. More specifically, as shown in FIG. 24 and FIG. 25, the driver 3 can be a stepper motor and has a driving structure 33 (e.g., a driving shaft) transmittingly connected to rotating member 12 to provide driving force for rotation, thereby allowing the rotating member 12 to rotate in a clockwise or counterclockwise direction. The driving structure 33 can be connected to the rotating member 12 via a gear set (not shown in FIG. 24 and FIG. 25) that can be composed of a plurality of gears with different diameters, but the present disclosure is not limited thereto.

In order to realize an optical system having low beam and high beam modes, the light emitting unit 13 can include a first light emitting unit 13a and a second light emitting unit 13b. The first light emitting unit 13a and the second light emitting unit 13b are arranged in proximity to a lens focus 201, and the first light emitting unit 13a is arranged above the second light emitting unit 13b. More details about the light-emitting unit 13 are provided in the first embodiment and FIG. 20 and FIG. 21. The light distributing member 15 located at the first position covers the second light emitting unit 13b, as shown in FIG. 26, such that a resulting illumination pattern is a low beam illumination pattern. The light distributing member 15 located at the second position allows the first light emitting unit 13a and the second light emitting unit 13b to be exposed therefrom, as shown in FIG. 27, such that a resulting illumination pattern is a high beam illumination pattern.

It is worth mentioning that, in the optical system of the present embodiment, the arrangement of the light-emitting unit 13 is not limited to those shown in FIG. 20 and FIG. 21. In the presence of the light distributing member 15, the light-emitting unit 13 can include one or more LED chips.

More specifically, the light distributing member 15 is fixed to the wall portion 12c and connected to the outer frame portion 12a of the rotating member 2 via a balancing member 16. The balancing member 16 can be a spring, but is not limited thereto. In use, in a low beam mode, the balancing member 16 is in an original state to lift up the light distributing member 15 to the first position. In a high beam mode, the balancing member 16 is in a compressed state to allow the light distributing member 15 to be guided to the second position.

Figure 28:
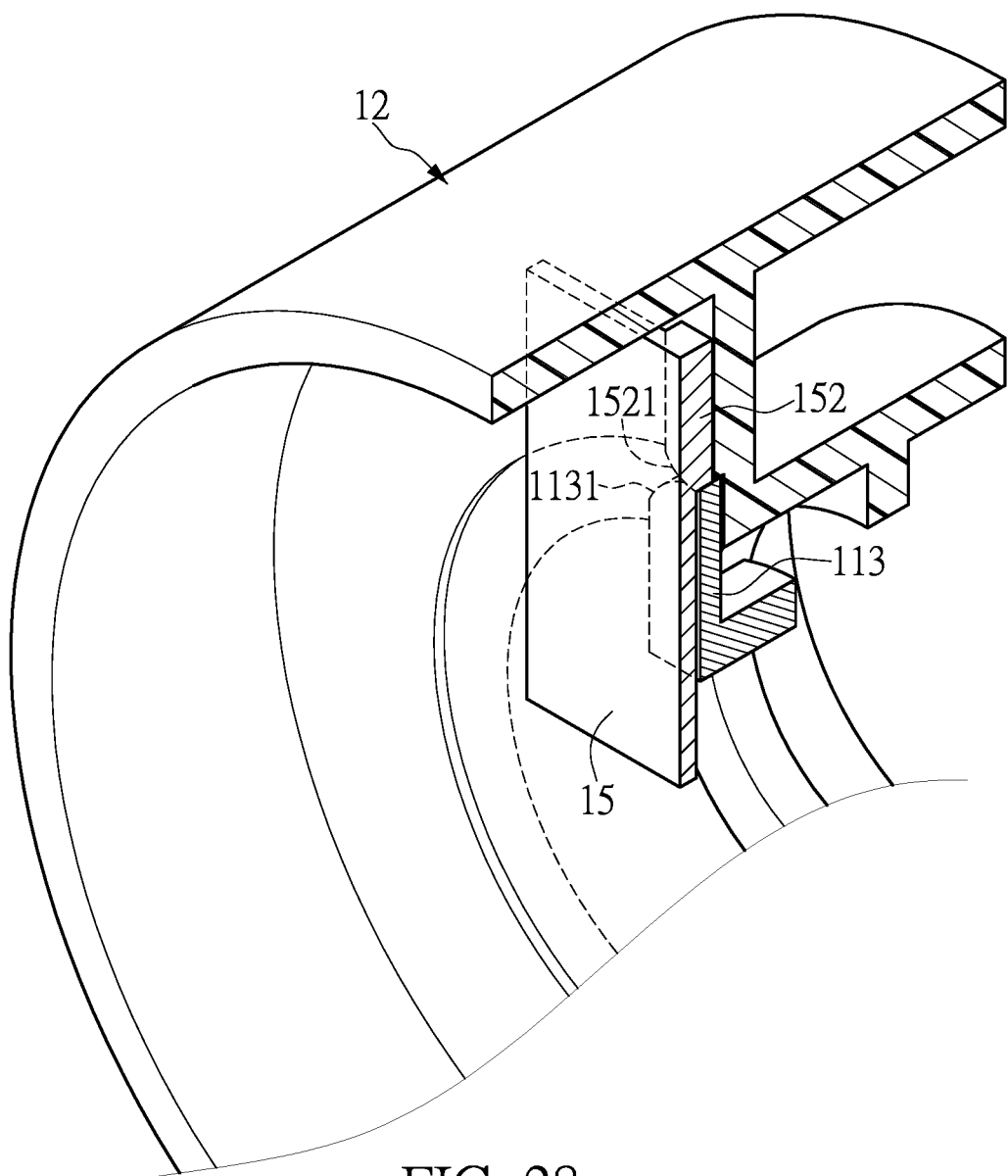
FIG. 28 and FIG. 29 respectively show a cooperative relationship between the light distributing member and a lifting structure in the adaptive vehicle headlight according to the second embodiment of the present disclosure.
Figure 29:
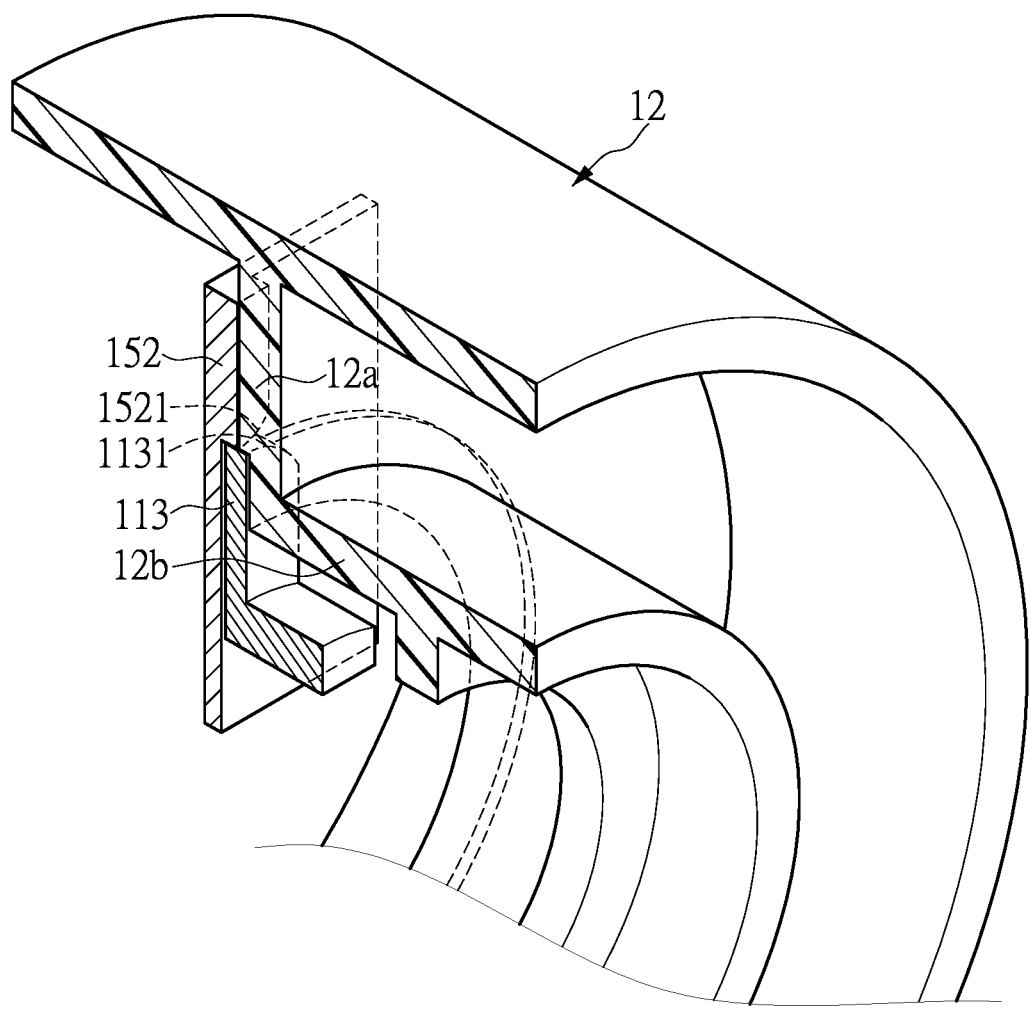

In practice, as shown in FIG. 28 and FIG. 29, the carrying portion 11a of the base 11 can have a lifting structure 113 with a first guiding surface 1131. In addition, the light distributing member 15 can have a guiding structure 152 with a second guiding surface 1521. Each of the first guiding surface 1131 and the second guiding surface 1521 can be an arc surface. Accordingly, the light distributing member 15 can be guided by the guiding structure 152 and lifted up to the second position by the lifting structure 113. That is, the light distributing member 15 is lifted up to the second position by the slidable cooperation of the second guiding surface 1521 of the guiding structure 152 with the first guiding surface 1131 of the lifting structure 113. The above description is for exemplary purposes only and is not intended to limit the scope of the present disclosure.

Although FIG. 27 to FIG. 29 shows that the light distributing member 15 is moved up by a contact force produced between the light distributing member 15 and the carrying portion 11a of the base 11, in practice, the light distributing member 15 can be moved up by a non-contact force produced between the light distributing member 15 and the carrying portion 11a of the base 11. In an embodiment not shown in the above figures, magnetic components can be arranged between the light distributing member 15 and the carrying portion 11a of the base 11. The magnetic components can produce a magnetic force such as a magnetic attraction force to raise the light distributing member 15 to a predetermined height, or produce another magnetic force such as a magnetic repulsion force to lower the light distributing member 15 to an initial height.

In some applications, as shown in FIG. 23, FIG. 26, and FIG. 27, a limiting member 17 can be arranged between the light distributing member 15 and the outer frame portion 12a of the rotating member 12 to limit the balancing member 16 (e.g., a horizontal movement of the balancing member 16). The limiting member 17 can be a limiting pin, but is not limited thereto. More specifically, the light distribution member 15 can have a pin hole 153 at the bottom thereof. The limiting member 17 can pass through the pin hole 153 and a distal end thereof can be inserted into and fixed in position to the outer frame portion 12a of the rotating member 12.

Figure 30:
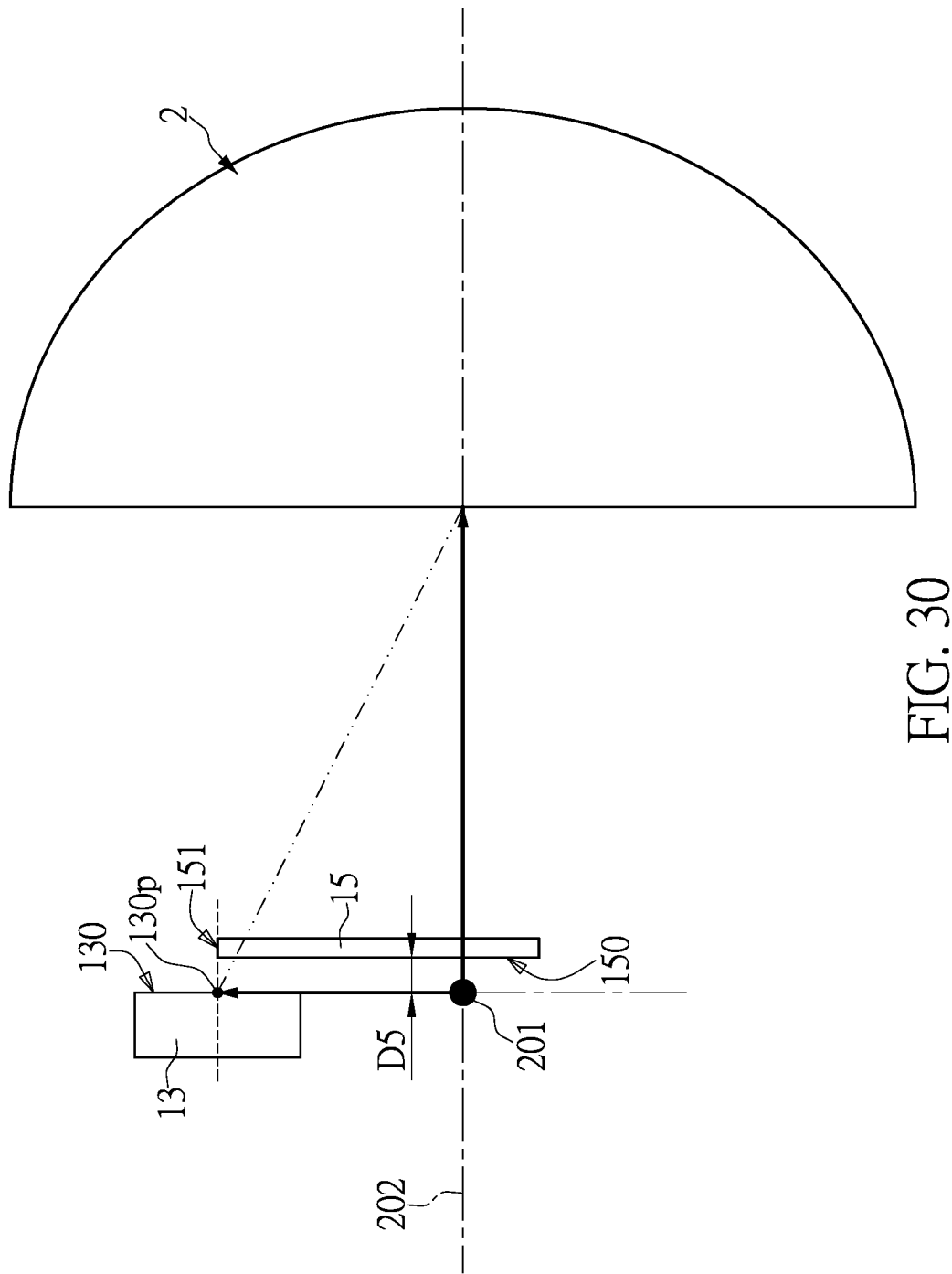
FIG. 30 is a schematic view showing an optical design of the adaptive vehicle headlight according to the second embodiment of the present disclosure.

Reference is made to FIG. 30, in a preferable design of the optical system of the present embodiment, the light emitting unit 13 has a light emitting surface 130, and the center point P of the light emitting surface 130 is flush with an optically effective edge 151 of the light distributing member 15. Furthermore, the light distributing member 15 has an inner surface 150 opposite to the light emitting surface 130, and a horizontal distance D5 between the inner surface 150 and the light emitting surface 130 satisfies: 0 mm<horizontal distance D5≤1.0 mm.

Third Embodiment

Referring to FIG. 31 to FIG. 38, a third embodiment of the present disclosure provides an adaptive vehicle headlight Z including a light body 1, an optical lens 2, a driver 3, and a control unit 4. The optical lens 2, the driver 3, and the control unit 4 are integrated into the light body 1. More specifically, the light body 1 includes a base 11, a light emitting unit 13, a light guiding member 18, a rotating member 12, and a light distributing member 15. The light emitting unit 13 and the light guiding member 18 are arranged on the base 11, and the light emitting unit 13 is configured to emit an illumination light beam toward the light guiding member 18. The rotating member 12 is configured to rotate relative to the base 11. The light distributing member 15 is connected as a whole to the rotating member 12. The optical lens 2 is configured to project the illumination light beam outwardly so as to produce an illumination pattern having a cut-off line. The light distributing member 15 is arranged between the optical lens 2 and the light emitting unit 13. The driver 3 is configured to drive the rotating member 12. The control unit 4 is configured to cause an operation of the driver 3 according to a low beam mode and a high beam mode, such that the light distributing member 15 is driven by the rotating member 12 to move to a first position or a second position.

In the present embodiment, the base 11 has a carrying surface 111' perpendicular to a light input surface 200 of the optical lens 2 and located below a lens optical axis 202. The light emitting unit 13 and the light guiding member 18 are arranged on the carrying surface 111', and the illumination light beam emitted from the light emitting unit 13 is guided by the light guiding member 18 and transmitted to the light input surface 200 of the optical lens 2 along a predetermined path. The rotating member 12 is connected to the driver 3, and the rotating member 12 and the driver 3 are each at a position avoiding the predetermined path along which the illumination light beam is transmitted.

Figure 35:
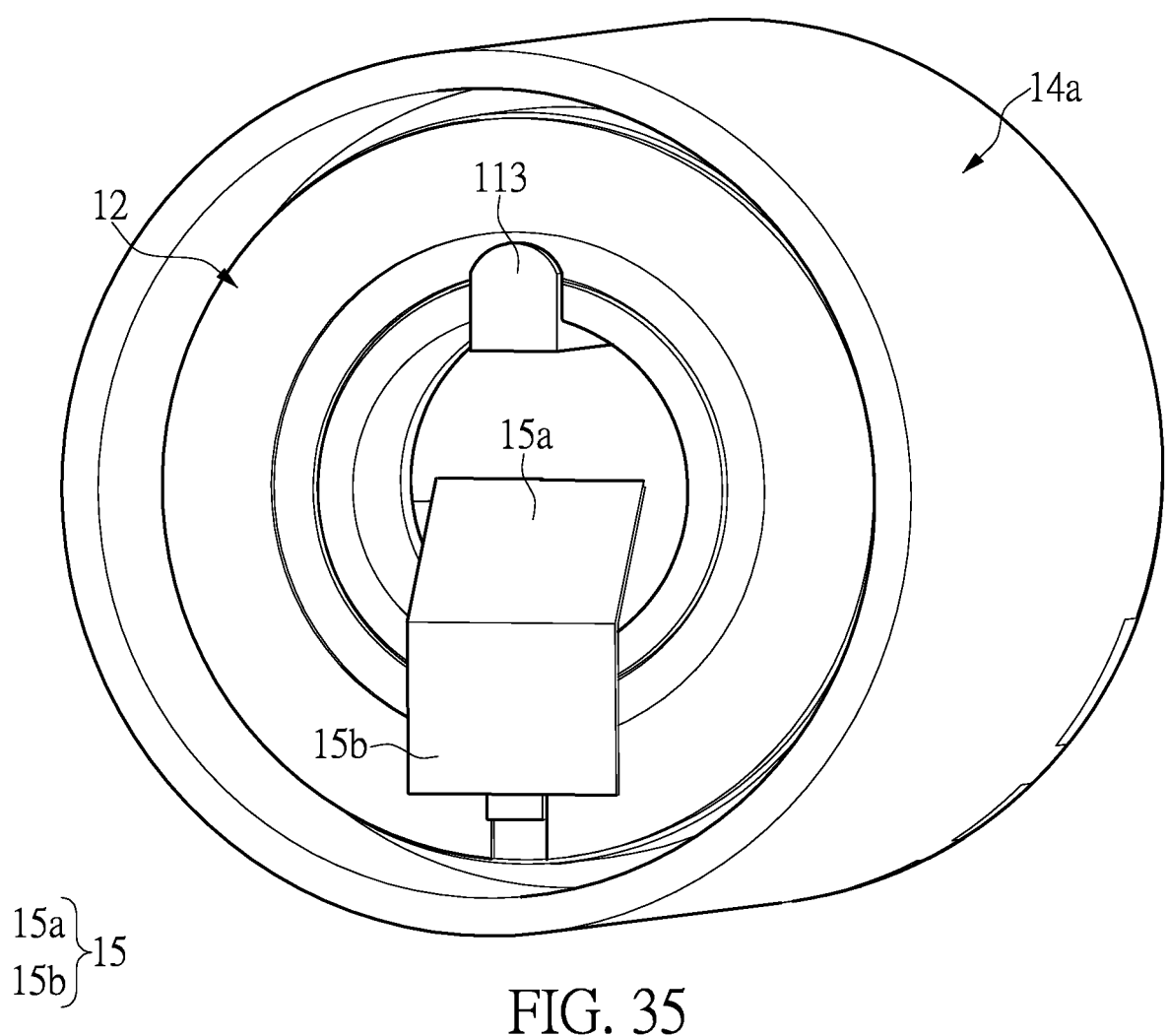
FIG. 35 is a schematic view showing a first mode of the adaptive vehicle headlight according to the third embodiment of the present disclosure, in which a light distributing member is moved to a first position through a rotation of a rotating member.
Figure 36:
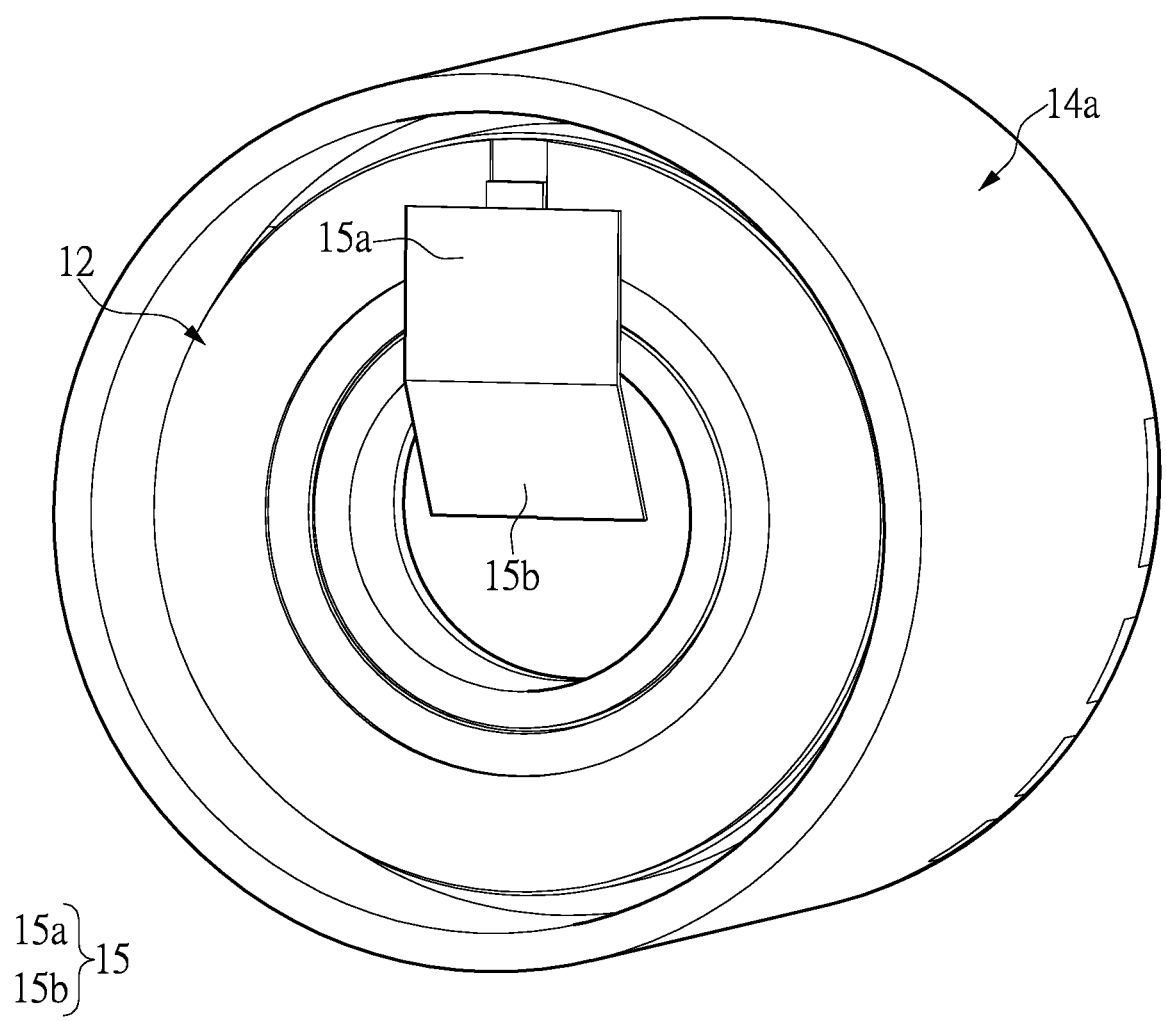
FIG. 36 is a schematic view showing a second mode of the adaptive vehicle headlight according to the third embodiment of the present disclosure, in which the light distributing member is moved to a second position through a rotation of the rotating member.

In the above-mentioned structure, as shown in FIG. 35, the light distributing member 15 located at the first position can shield a portion of the illumination light beam transmitted along the predetermined path, so as to produce a low beam illumination pattern. As shown in FIG. 36, the light distributing member 15 located at the second position can allow all the illumination light beam transmitted along the predetermined path to enter the optical lens 2 through the light input surface 200, so as to produce a high beam illumination light pattern.

More specifically, the base 11 has a carrying portion 11a and a spacing portion 11b. The spacing portion 11b is configured to divide the internal space of the light body 1 into a first space S1 and a second space S2. The spacing portion 11b has an opening 114, and the first space S1 is in spatial communication with the second space S2 via the opening 114. The carrying portion 11a has the carrying surface 111'. The rotating member 12, the light distributing member 15, and the optical lens 2 are located in the first space S1. The driver 3 can be located the first space S1 or the second space S2.

It should be noted that, the definition of the light body 1, in which the internal space is divided into the first space S1 and the second space S2, is for ease of illustration of the positional relationship between the rotating member 12, the light emitting unit 13, and the light distributing member 15, the present disclosure is not limited thereto. In certain embodiments, the rotating member 12 and the light distributing member 15 can be located in the second space S2 and between the light emitting unit 13 and the optical lens 2. In such a structure, if the spacing portion 11b is closer to the light emitting unit 13, the rotating member 12 and the light distributing member 15 would be farther away from the light emitting unit 13. If the spacing portion 11b is farther away from the light emitting unit 13, the rotating member 12 and the light distributing member 15 would be closer to the light emitting unit 13.

Figure 31:
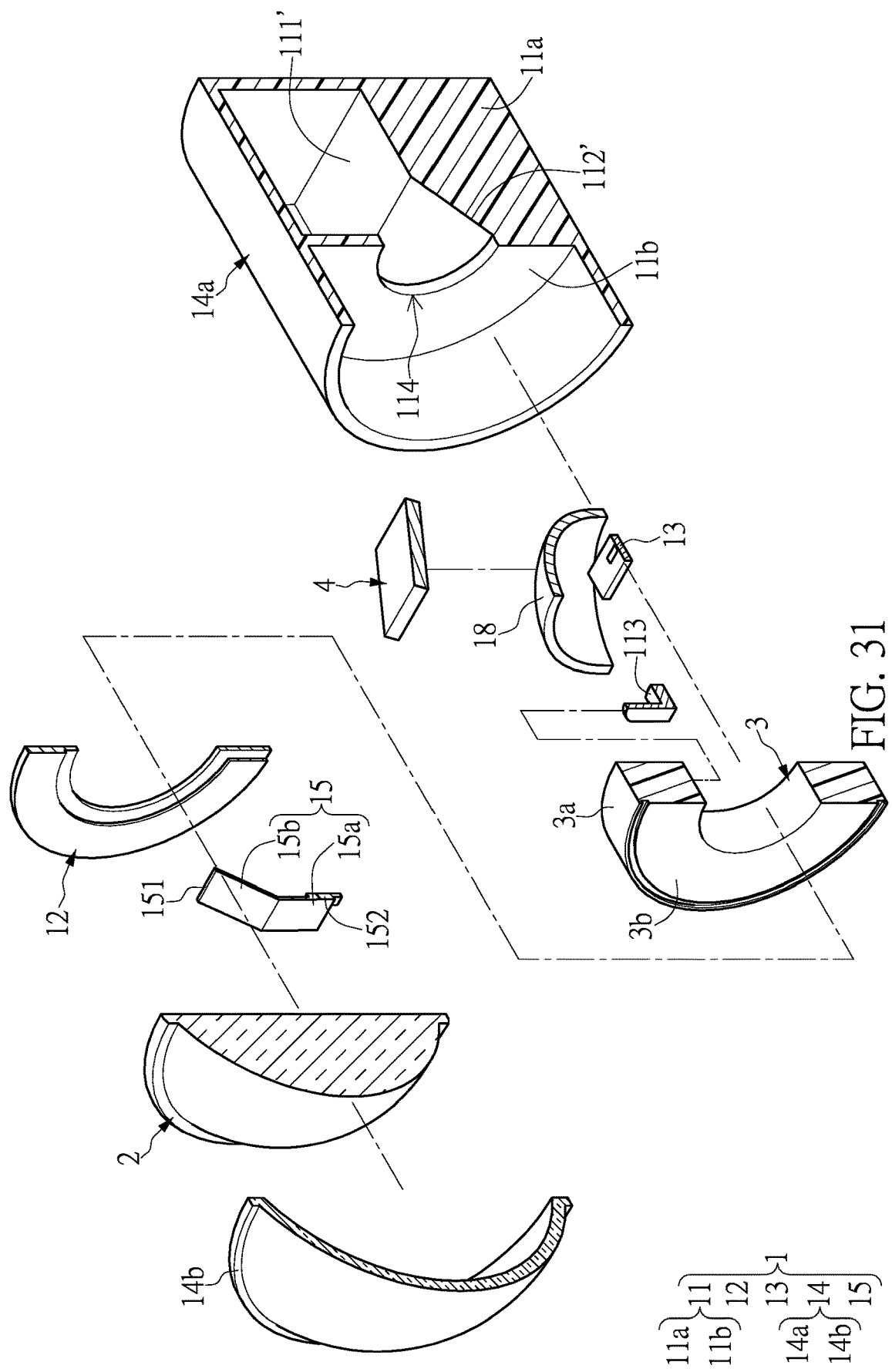
FIG. 31 is a perspective partially exploded sectional view of a first implementation of an adaptive vehicle headlight according to a third embodiment of the present disclosure.
Figure 32:
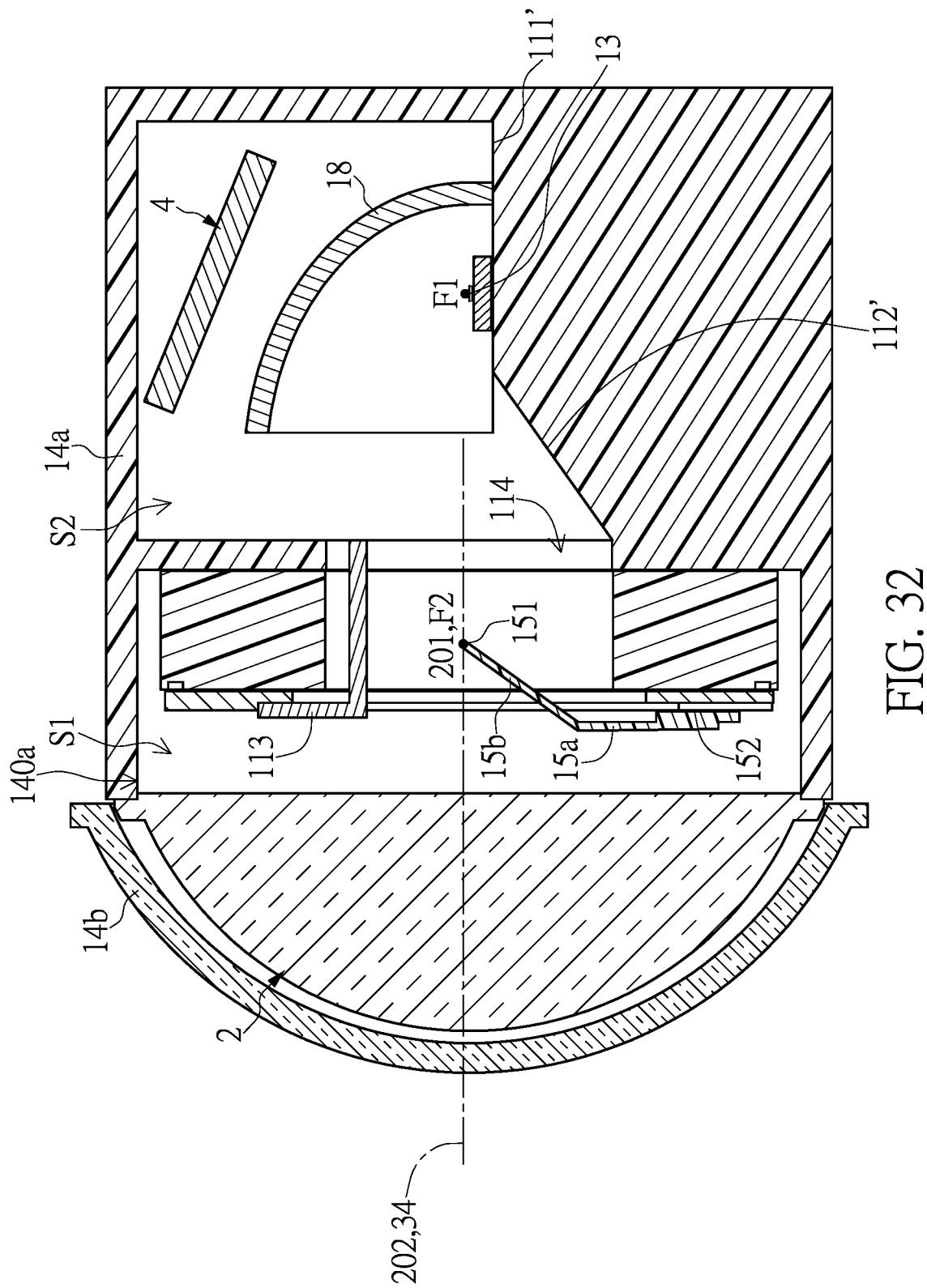
FIG. 32 is a sectional schematic view of the first implementation of the adaptive vehicle headlight according to the third embodiment of the present disclosure.

As shown in FIG. 31 and FIG. 32, an external structure of the light body 1 includes a housing 14a and a light cover 14b. The housing 14a has an open end 140a and a closed end (not numbered), the shape of which is not limited to a cylindrical shape. The light cover 14b is assembled to the open end 140a of the housing 14a. The base 11 can be integrally formed inside the housing 14a. One portion (e.g., a front portion) of the housing 14a and the spacing portion 11b of the base 11 jointly define the first space S1, and another one portion (e.g., a rear portion) of the housing 14a and the spacing portion 11b of the base 11 jointly define the second space S2.

Depending on particular requirements, another open end can be formed in place of the closed end of the housing 14a and is closed by a back lid. Other relevant details are provided in the first embodiment and FIG. 4 to FIG. 6.

In one implementation of the present embodiment, the rotating member 12 is driven in a non-contact manner. More specifically, as shown in FIG. 31 and FIG. 32, the driver 3 is arranged in the first space S1 of the light body 1. The driver 3 can be a brushless pan/tilt motor and includes a stator portion 3a and a rotor portion 3b. The stator portion 3a can be connected to the spacing portion 11b of the base 11, and the rotor portion 3b can rotate in a clockwise or counterclockwise direction about a rotation axis 34 by cooperating with the stator portion 3a. The rotation axis 34 can coincide with or be slightly offset from the lens optical axis 202. In practice, the stator portion 3a can include a coil structure (not shown in FIG. 31 and FIG. 32) that can be composed of iron cores with coils. The rotor portion 3b can include a magnetic body (not shown in FIG. 31 and FIG. 32) that can be formed from one or more magnets. The rotating member 12 can be connected to the rotor portion 3b so as to synchronously rotate with the rotor portion 3b. The rotating member 12 is not limited to have a disc shape, and it is formed with a hollow area corresponding in position to the opening 114 of the spacing portion 11b.

Figure 33:
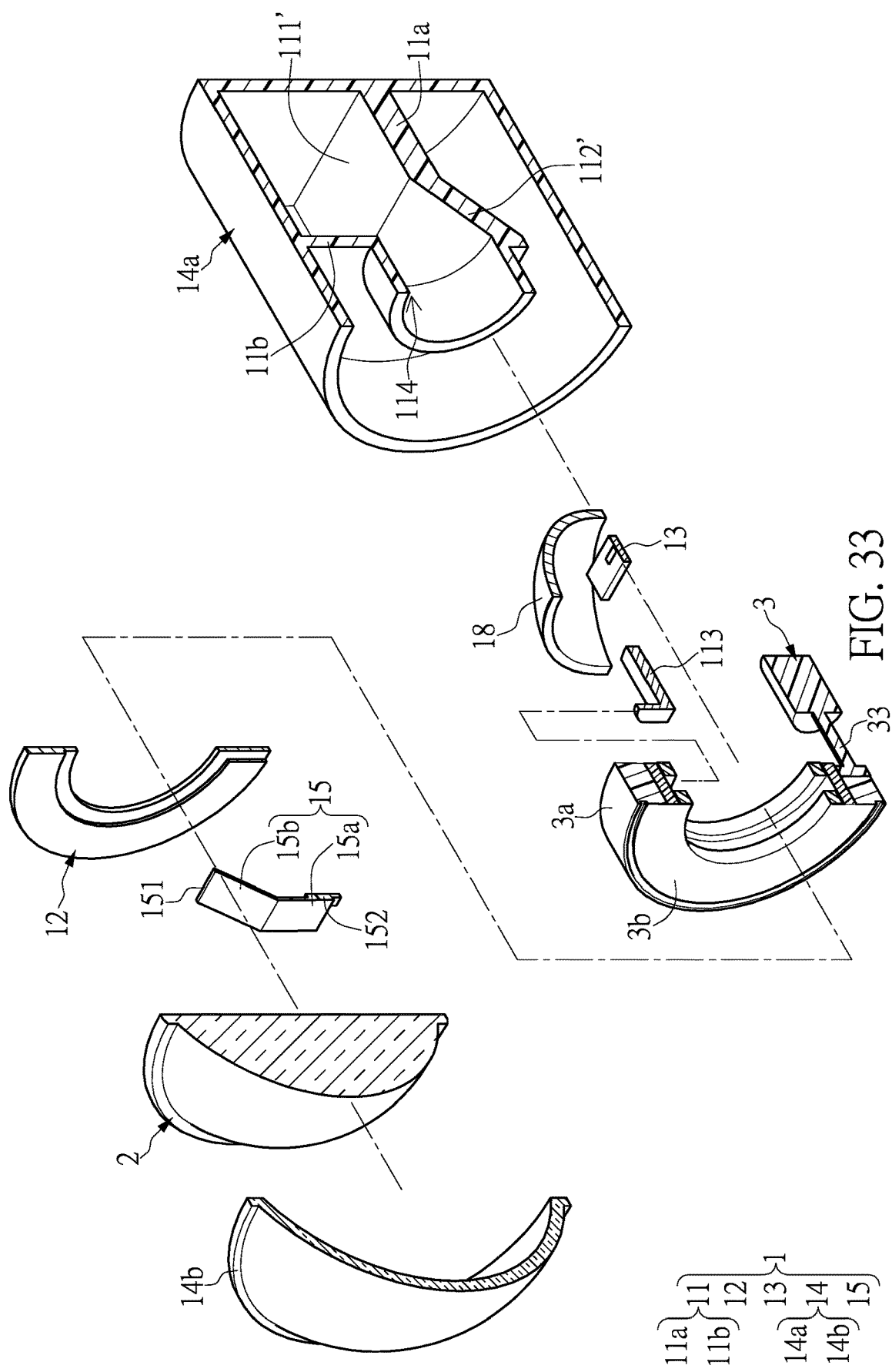
FIG. 33 is a perspective partially exploded sectional view of a second implementation of the adaptive vehicle headlight according to the third embodiment of the present disclosure.
Figure 34:
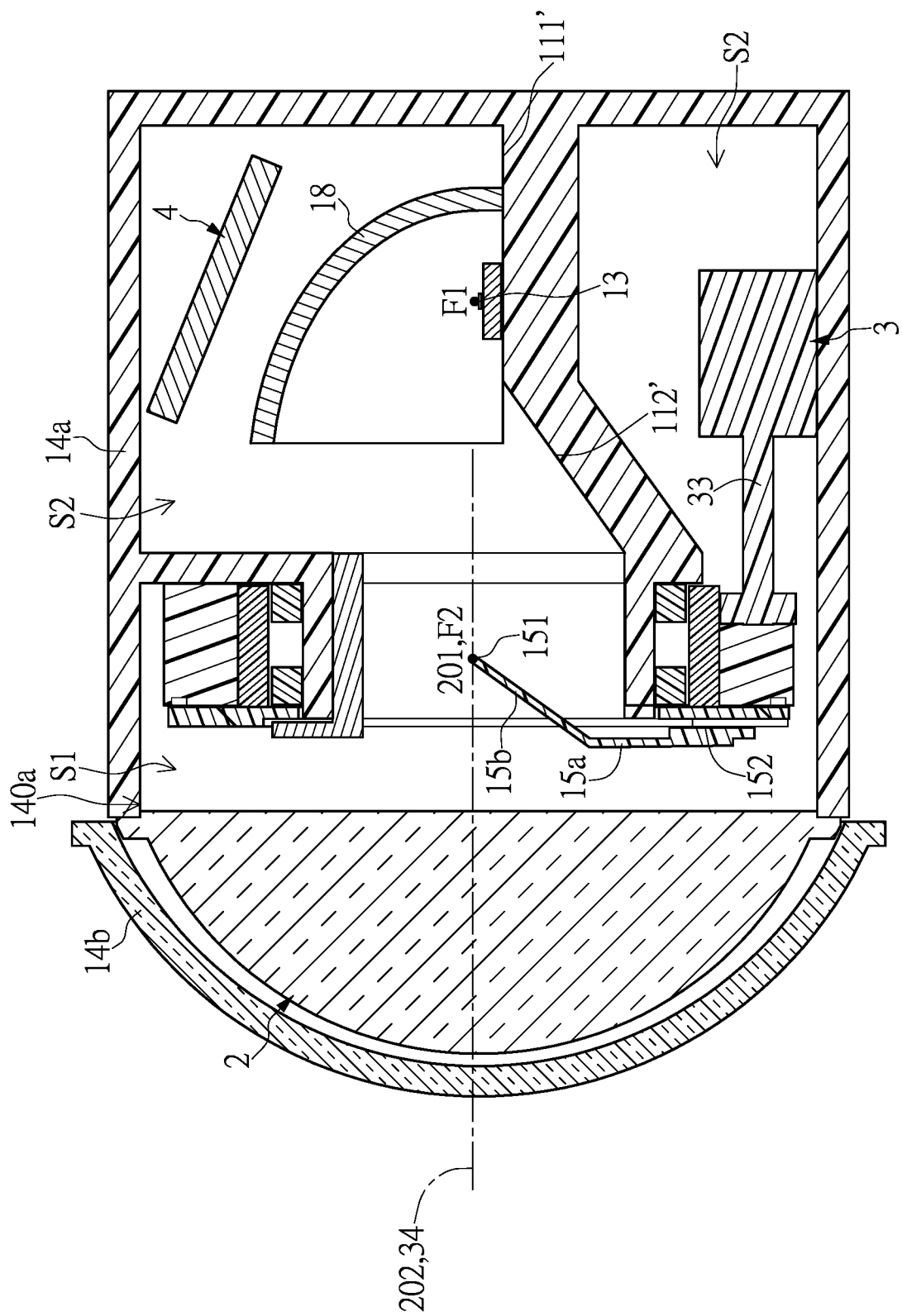
FIG. 34 is a sectional schematic view of the second implementation of the adaptive vehicle headlight according to the third embodiment of the present disclosure.

In another one implementation of the present embodiment, the rotating member 12 is driven in a direct contact manner. More specifically, as shown in FIG. 33 and FIG. 34, the driver 3 is arranged in the second space S2 of the light body 1. The driver 3 can be a stepper motor and has a driving structure 33 (e.g., a driving shaft) transmittingly connected to rotating member 12 to provide driving force for rotation, thereby allowing the rotating member 12 to rotate in a clockwise or counterclockwise direction. The driving structure 33 can extend from the second space S2 to the first space S1 and be connected to the rotating member 12 via a gear set (not shown in FIG. 33 and FIG. 34) that can be composed of a plurality of gears with different diameters, but the present disclosure is not limited thereto.

The control unit 4 can include a control printed circuit board (PCB) and at least has control functions of the light emitting unit 13 and the driver 3. Although FIG. 32 shows that the control unit 4 is arranged above the light guiding member 18, the arrangement position of the control unit 4 can be adjusted depending on particular requirements. In certain embodiments, depending on cost considerations or different use requirements, the control unit 4 can be arranged at the outside of the light body 1 and electrically connected to the light emitting unit 13 and the driver 3 (e.g., the coil structure 31 of the driver 3).

In an optical system of the present embodiment, the carrying surface 111' is located below the lens optical axis 202. The light guiding member 18 has a reflecting surface 180 that can define a first focus F1 and a second focus F2. The light guiding member 18 can be a light reflecting cup, but is not limited thereto. The first focus F1 is located in a cover region of the light guiding member 18, and it is located on the lens optical axis 202 or below the lens optical axis 202, and preferably below the lens optical axis 202. The second focus F2 is located outside of the cover region of the light guiding member 18, and it coincides with the lens focus 201 or is in proximity to the lens focus 201, and preferably coincides with the lens focus 201.

The light emitting unit 13 is arranged on the carrying surface 111' in a manner that a light emitting surface 130 thereof faces upward (i.e., the light emitting surface 130 is parallel to the carrying surface 111'). The light emitting unit 13 can be located at the first focus F1 or in proximity to the first focus F1. The light emitting unit 13 can be an LED package structure, which can include one or more LED chips, and can further include one or more wavelength converting layers (e.g., fluorescent layers) covering the LED chips, so as to produce optical characteristics required for practical implementations. In a structure with a light emitting unit 13 that includes a plurality of LED chips, the arrangement of the LED chips is not particularly limited and can be adjusted depending on particular requirements. In use, the illumination light beam emitted from the light emitting unit 13 can be reflected by the light guiding member 18 to transmit toward the light input surface 200 of the optical lens 2. In consideration of the light output of the light emitting unit 13, the carrying portion 11a can further has a stage differential surface 112' connected to the carrying surface 111'. The stage differential surface 112' extends downwardly and obliquely to the spacing portion 11b. Accordingly, the carrying portion 11a can be arranged without interfering with the transmission path of the illumination light beam to reduce light transmission loss.

The light distributing member 15 includes an upright portion 15a and an inclined portion 15b. The upright portion 15a is fixed to the rotating member 12. The inclined portion 15b extends toward the spacing portion 11b of the base 11 from the upright portion 15a, and a free end thereof is not connected to other parts and has an optically effective edge 151. In practice, the optical lens 2 can be an optical lens with circular symmetry, in which curvatures in the horizontal direction are the same as those in the vertical direction. When the light distributing member 15 is located at the first position, the lens focus 201 would be located on or in proximity to the optically effective edge 151, and preferably on the optically effective edge 151. Accordingly, the light distributing member 15 can shield a portion of light transmitted toward the light input surface 200 of the optical lens 2, and a resulting illumination pattern is a low beam illumination patter. When the light distributing member 15 is located at the second position, the optically effective edge 151 would be located above the lens focus 201. Accordingly, the light distributing member 15 can allow all the illumination light beam to enter the optical lens 2 through the light input surface 200, and a resulting illumination pattern is a high beam illumination patter.

FIG. 31 to FIG. 38 show that the upright portion 15a and the inclined portion 15b are included in the light distributing member 15. However, in certain embodiments, only the upright portion 15a or the inclined portion 15b is included in the light distributing member 15.

Figure 37:
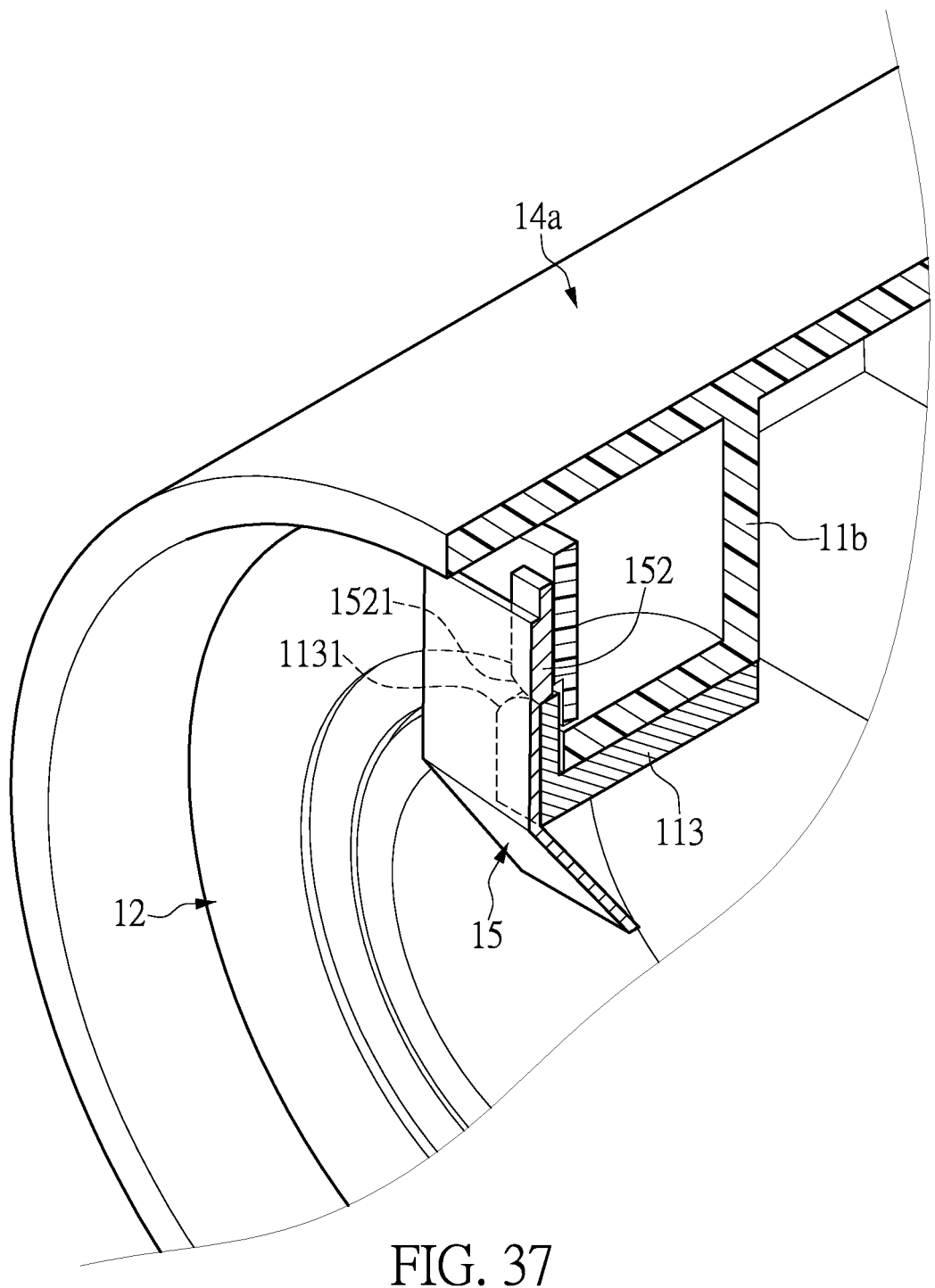
FIG. 37 and FIG. 38 respectively show a cooperative relationship between the light distributing member and a lifting structure in the adaptive vehicle headlight according to the third embodiment of the present disclosure.
Figure 38:
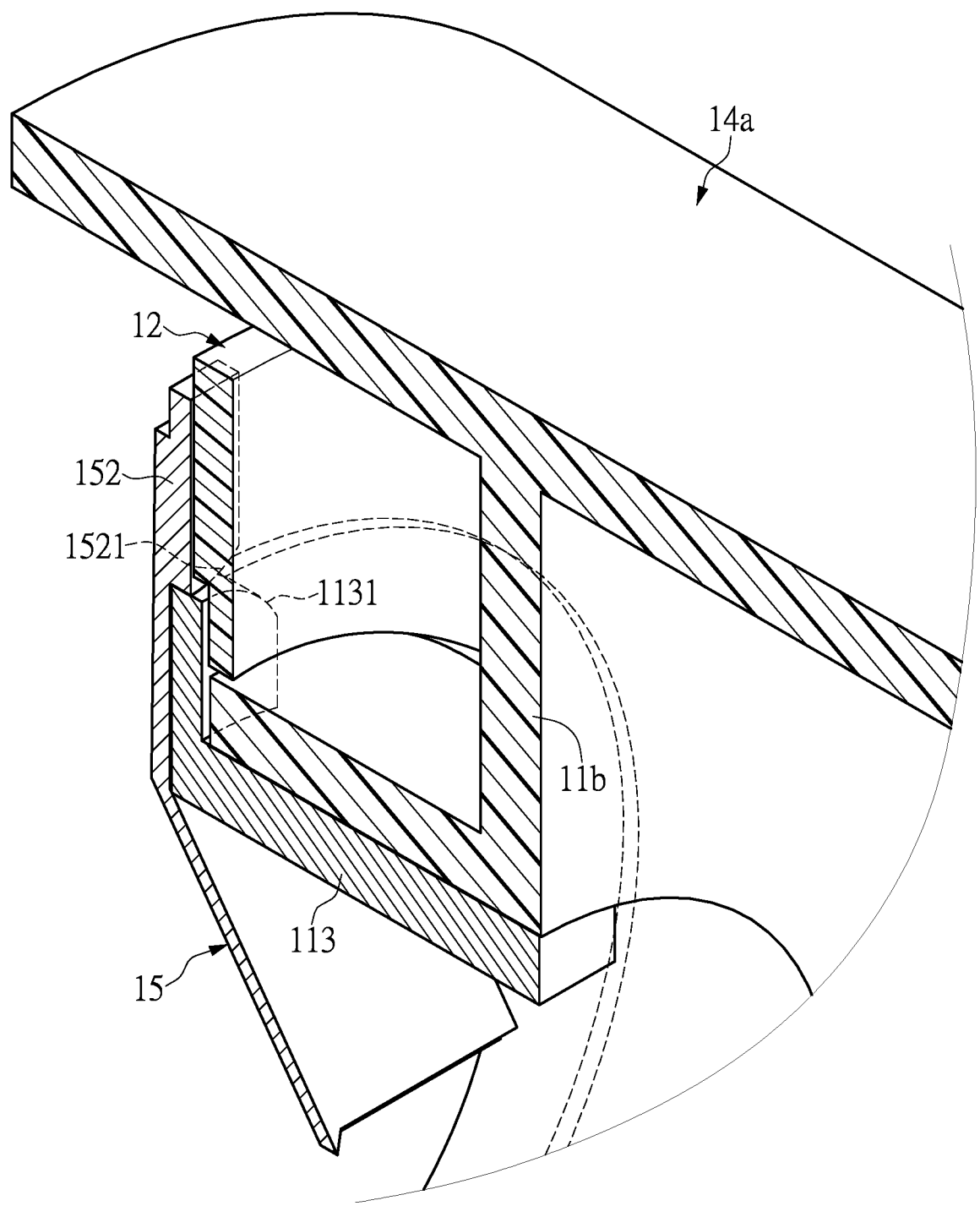

In practice, as shown in FIG. 37 and FIG. 38, the spacing portion 11b of the base 11 can have a lifting structure 113 with a first guiding surface 1131. In addition, the upright portion 15a of the light distributing member 15 can have a guiding structure 152 with a second guiding surface 1521. Each of the first guiding surface 1131 and the second guiding surface 1521 can be an arc surface. Accordingly, the light distributing member 15 can be guided by the guiding structure 152 and lifted up to the second position by the lifting structure 113. That is, the light distributing member 15 is lifted up to the second position by the slidable cooperation of the second guiding surface 1521 of the guiding structure 152 with the first guiding surface 1131 of the lifting structure 113. The above description is for exemplary purposes only and is not intended to limit the scope of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adaptive vehicle headlight for being installed on a vehicle body for use, comprising:
    a light body including a base, a rotating member and a light emitting unit, wherein the base has a carrying portion, the rotating member is configured to rotate relative to the base, and the light emitting unit is arranged on the carrying portion to emit an illumination light beam;
    an optical lens arranged in the light body to allow the illumination light beam to project outwardly so as to produce an illumination pattern in a horizontal state, wherein the optical lens is connected as a whole to the rotating member;
    a driver arranged in the light body to drive the rotating member; and
    a control unit arranged in the light body to cause an operation of the driver according to a tilt angle of the vehicle body, such that the rotating member and the optical lens synchronously rotate a predetermined angle to maintain the illumination pattern in the horizontal state;
    wherein the rotating member includes an outer frame portion, an inner frame portion and a wall portion, the outer frame portion and the inner frame portion are spaced apart from each other, the wall portion is connected between the outer frame portion and the inner frame portion, and the carrying portion is exposed from the wall portion;

wherein the optical lens is fixed to the outer frame portion, the driver includes a coil structure and a magnetic body, and the coil structure and the magnetic body are disposed between the outer frame portion, the inner frame portion and the wall portion.

2. The adaptive vehicle headlight according to claim 1, wherein the base is arranged to divide an internal space of the light body into a first space and a second space; wherein the carrying portion is located in the first space and the rotating member surrounds the carrying portion, the driver is arranged in the first space or the second space, and the control unit is arranged in the second space.

3. The adaptive vehicle headlight according to claim 2, wherein the optical lens has a light input surface, the carrying portion has a first carrying surface opposite to the light input surface, and the light emitting unit is disposed on the first carrying surface to emit the illumination light beam towards the light input surface.

4. The adaptive vehicle headlight according to claim 1, wherein the carrying portion has an accommodating groove, the inner frame portion and a bearing are jointly disposed in the accommodating groove, and the inner frame portion is supported by the bearing.

5. The adaptive vehicle headlight according to claim 2, wherein the base further has a spacing portion to separate the first space from the second space, and the carrying portion extends from the spacing portion; wherein the carrying portion has a first wire groove for passing wires outwardly from the light emitting unit, and the spacing portion has a second wire groove for passing wires outwardly from the coil structure.

6. The adaptive vehicle headlight according to claim 1, wherein the light body includes a light distributing member that is arranged between the optical lens and the light emitting unit and connected as a whole to the rotating member.

7. The adaptive vehicle headlight according to claim 6, wherein the light distributing member is configured to be driven by the rotating member to move to a first position or a second position, so as to selectively cover the light emitting unit.

8. The adaptive vehicle headlight according to claim 7, wherein the light emitting unit includes a first light emitting unit and a second light emitting unit, and the first light emitting unit is arranged above the second light emitting unit; the light distributing member is located at the first position to cover the second light emitting unit, such that the illumination pattern is a low beam illumination pattern.

9. The adaptive vehicle headlight according to claim 8, wherein the light distributing member is fixed to the wall portion and connected to the outer frame portion via a balancing member, and the balancing member is in an original state when the light distributing member is located at the first position.

10. The adaptive vehicle headlight according to claim 7, wherein the light emitting unit includes a first light emitting unit and a second light emitting unit, and the first light emitting unit is arranged above the second light emitting unit; the light distributing member is located at the second position to allow the first light emitting unit and the second light emitting unit to be exposed therefrom, such that the illumination pattern is a high beam illumination pattern.

11. The adaptive vehicle headlight according to claim 10, wherein the light distributing member is fixed to the wall portion and connected to the outer frame portion via a balancing member, and the balancing member is in a compressed state when the light distributing member is located at the second position, which is different from a state of the balancing member resulting from the light distributing member being at the first position.

12. The adaptive vehicle headlight according to claim 11, wherein the carrying portion has a lifting structure and the light distributing member has a guiding structure, and the light distributing member is guided by the guiding structure and lifted up to the second position by the lifting structure.

13. The adaptive vehicle headlight according to claim 12, wherein the lifting structure has a first guiding surface, and the guiding structure has a second guiding surface for slidable cooperation with the first guiding surface, so as to allow the light distributing member to abut against the lifting structure.

14. The adaptive vehicle headlight according to claim 11, wherein a limiting member is arranged between the light distributing member and the outer frame portion to limit the balancing member.

* * * * *